(12) United States Patent
Smith

(10) Patent No.: US 11,354,611 B2
(45) Date of Patent: Jun. 7, 2022

(54) MINIMIZING UNMET DEMANDS DUE TO SHORT SUPPLY

(71) Applicant: ORACLE INTERNATIONAL CORPORATION, Redwood Shores, CA (US)

(72) Inventor: Randall B. Smith, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 200 days.

(21) Appl. No.: 16/714,966

(22) Filed: Dec. 16, 2019

(65) Prior Publication Data

US 2021/0182754 A1 Jun. 17, 2021

(51) Int. Cl.
*G06Q 10/06* (2012.01)

(52) U.S. Cl.
CPC .............................. *G06Q 10/06315* (2013.01)

(58) Field of Classification Search
None
See application file for complete search history.

(56) References Cited

U.S. PATENT DOCUMENTS

| | | | |
|---|---|---|---|
| 7,610,212 | B2 | 10/2009 | Klett et al. |
| 8,165,904 | B2 | 4/2012 | Srinivasan et al. |
| 8,447,644 | B2 | 5/2013 | Nephew et al. |
| 2002/0188499 | A1 | 12/2002 | Jenkins et al. |
| 2003/0208392 | A1 | 11/2003 | Shekar et al. |
| 2004/0133458 | A1 | 7/2004 | Hanrahan |
| 2005/0097011 | A1 | 5/2005 | Jain et al. |
| 2013/0117162 | A1 | 5/2013 | Feng et al. |
| 2015/0379449 | A1* | 12/2015 | Gopinath .............. G06Q 10/087 705/7.25 |
| 2019/0238620 | A1* | 8/2019 | Narayanam .............. H04L 67/10 |
| 2019/0258979 | A1* | 8/2019 | Mulay .............. G06Q 10/06315 |
| 2020/0012983 | A1* | 1/2020 | Wicker .............. G06Q 10/0875 |

OTHER PUBLICATIONS

Luo et al., A Dynamic Vehicle Routing Problem for Responding to Large-Scale Emergencies, 2017 (Year: 2017).*
Varghese et al, Stockout prediction using matrices and linear supply chain model (Year: 2018).*
Li et al., "A General Framework for Unmet Demand Prediction in On-Demand Transport Services," IEEE Transactions on Intellig . . . , vol. 20, Issue 8, Oct. 19, 2018 (24 pgs).
US Patent and Trademark Office, 1st Non-Final Office Action issued in co-pending U.S. Appl. No. 16/879,219, filed May 20, 2020, having a notification date of Oct. 27, 2021 (17 pgs).

* cited by examiner

*Primary Examiner* — Mohamed N El-Bathy
(74) *Attorney, Agent, or Firm* — Kraguljac Law Group, LLC

(57) ABSTRACT

Systems, methods, and other embodiments associated with minimizing (unfulfilled orders) due to short supply in an order fulfillment context are described. One embodiment includes: Identifying one or more Distributions within a timeframe. For each of the Distributions, identifying a set of maximal excess configurations of met and unmet demands from a set of all demands for the product during the Distribution. Creating a current output set of configurations. Assigning supply units for at least one configuration of a final output set for a final Distribution within the timeframe. Transmitting an instruction to fulfill demands in accordance with the assignments.

18 Claims, 15 Drawing Sheets

MINIMIZING UNMET DEMANDS DUE TO SHORT SUPPLY

BACKGROUND

Cloud-based operations management systems may include order fulfillment software that manages the task of matching supplies to demands. One such cloud-based operations management system is Oracle® Netsuite®.

As referred to herein, a "supply" refers to a quantity of goods (or services) that is available for distribution, such as a shipment of the goods from a manufacturer, a completed production run of the goods, or goods on hand in inventory. A supply has both a size element that indicates the number of units of the item that is made available by the supply, and a time element that indicates when the supply becomes available for further distribution. A "demand" refers to a request that a particular quantity of the goods be distributed, such as an order. A demand has both a size element that indicates the number of units of the item that required in order to meet the demand, and a time element that indicates when the demand should be met. In some situations, a demand may also have a priority element indicating a precedence in which the demand should be met in relation to other demands. While in some contexts, the term "order fulfillment" may include vehicle route planning for delivery, as used herein, the term "order fulfillment" refers to allocation of quantities of the supply to fulfill demands.

The available (in stock, on hand) supply of goods is not always immediately adequate to satisfy the demands presented. Instead, the available supply must be allocated among the demands, with some demands going unfulfilled. Some order fulfillment software, including the order fulfillment software included in Oracle® Netsuite®, does not automatically partially fill demands. Thus, if a demand can only be partially filled, the order fulfillment software will instead leave that demand entirely unmet and retain the unused supply for satisfying other demands.

"Eager" or "greedy" algorithms are those that make the locally optimal choice at each stage. At present, order fulfillment software "eagerly" assigns available supply to demands until all demands are fully met, or the available supply is exhausted. Any unused supply is passed on to the next day, and may include supply that was saved by the policy of not partially filling a demand. This approach may be satisfactory when there is no shortage of supply, but in the face of a shortage of supply it may result in unnecessarily many unmet demands. For example, an eager order fulfillment method will not intentionally leave a demand unmet in order to fulfill two or more future demands.

But, in some situations, it is best to determine an order fulfillment allocation that fulfills as many demands as possible. Consider, as a simple example, a business that operates a distribution center warehouse that receives supplies of a single type of item, and allocates those supplies to various retail destinations by packing the items and shipping them directly from the warehouse to the retail destinations. In the context of the order fulfillment software, each requested shipment to a destination retail establishment may be considered a "demand." Presumably, the lost customer "good will" for unmet demands of the same priority is roughly similar regardless of demand size, shipping cost, order size, or any other concern. Further, each unmet demand may place an administrative burden on the business entity fulfilling the demand, such as communicating with the retail destinations (and or customers) whose orders are unmet. These costs may be simply measured by the number of unmet demands.

Given this model of cost (quantified by unmet demands) and "all-or-nothing" fulfillment, it can be better for the business entity to intentionally leave a large demand unmet today in order to fill several smaller demands of equal priority to the large demand tomorrow, even if the available supply is more than sufficient to meet the large demand. Also, when unmet demands are few in number, each can be handled as a special case: for example, they might be contacted to see if a later date or some way to split the order can be arranged. For such reasons, it is important to minimize the number of unmet demands.

But, current approaches to matching supply to demand do not act to minimize unmet demands, and can result in unnecessarily many unmet demands in the face of a supply shortage. This increases customer dissatisfaction due to unmet demands and puts additional burdens on a business to handle the unmet demands.

SUMMARY

In one embodiment, a computer-implemented method is presented. One or more runs of consecutive time units are identified within a timeframe. Supplies of a product are added to a stock of the product and demands for the product are fulfilled from the stock of the product during the timeframe. A run begins with a time unit that includes an addition of supply to the stock and includes all subsequent consecutive time units that do not include another addition of supply to the stock. For each of the runs of consecutive time units, a set of maximal excess configurations of met and unmet demands is identified from a set of all demands for the product during the run. Also, for each of the runs of consecutive time units, a current output set of configurations for the run is created. For at least one configuration selected from a final current output set for a final run within the timeframe, supply units from a specific supply are assigned to satisfy a demand quantity of each met demand. An instruction to fulfill demands over the timeframe in accordance with the assignments is transmitted.

In a further embodiment, for each of the runs of consecutive time units, all configurations except the configuration with the greatest amount of excess supply for each possible number of unmet demands during the run are removed from the current output set of configurations.

In a further embodiment, for each of the runs of consecutive time units, those configurations with an excess supply greater than an excess supply of a configuration with the smallest amount of excess supply that meets or exceeds a total supply deficit of all remaining runs within the timeframe are removed from the current output set of configurations.

In a further embodiment, a graphical user interface that shows the supplies and demands associated with each time unit of the timeframe is displayed. An input is accepted through the graphical user interface that causes a specific supply or demand to be associated with a specific time unit of the timeframe. Each of (i) identifying the one or more runs, (ii) identifying the set of maximal excess configurations, (iii) creating the current output set of configurations, and (iv) assigning the supply units is initiated in response to the acceptance of the input.

In a further embodiment, for each of the runs of consecutive time units, either (i) any configuration that includes a particular demand in response to parsing an indication that the particular demand is required to be met is removed from the current output set of configurations of met and unmet demands, or (ii) any configuration that does not include the particular demand in response to parsing an indication that the particular demand is required to be unmet is removed from the current output set of configurations of met and unmet demands.

In a further embodiment, an input is accepted that interrupts processing before creation of the current output set of configurations in one of the runs. The previous output set is assigned to be the final current output set.

In a further embodiment, the demands for the product are each associated with a fulfillment priority level. Each of (i) identifying the set of maximal excess configurations, (ii) creating the current output set of configurations, and (iii) assigning the supply units are performed for all demands of a first fulfillment priority level before being performed again for all demands of a lower second priority level.

In a further embodiment, the demands for the product are each associated with a fulfillment priority level. A graphical user interface is displayed that shows the demands associated with each priority level. An input that causes a demand to be associated with a specific priority level is accepted through the graphical user interface. Each of (i) identifying the one or more runs, (ii) identifying the set of maximal excess configurations, (iii) creating the current output set of configurations, and (iv) assigning the supply units is initiated in response to the acceptance of the input.

In a further embodiment, assigning the supply units includes, for each run of consecutive time units in turn from a latest run through an earliest run, for each met demand in the run, assigning the met demand's demand quantity of the supply units from the latest-available unexhausted source of supply.

In a further embodiment, creating the current output set of configurations for the run includes (i) where there is a previous output set of maximal excess configurations for a previous run of consecutive time units, creating the current output set of configurations by combining the set of maximal excess configurations with the previous output set, and (ii) where there is no previous output set of maximal excess configurations for a previous run of consecutive time units, creating the current output set of configurations by assigning the set of maximal excess configurations to be the current output set.

In a further embodiment, for each of the runs of consecutive time units, selected configurations are removed from the current output set of configurations.

In a further embodiment, the demands for the product are each associated with a fulfillment priority level. A graphical user interface that shows the supplies and demands associated with each priority level is displayed. An input is accepted through the graphical user interface that causes a demand to be associated with a specific priority level. Each of (i) identifying the one or more runs, (ii) identifying the set of maximal excess configurations, (iii) creating the current output set of configurations, and (iv) assigning the supply units is initiated in response to the acceptance of the input. Each of (i) identifying the set of maximal excess configurations, (ii) creating the current output set of configurations, and (iii) assigning the supply units are performed for all demands of a first fulfillment priority level before being performed again for all demands of a lower second priority level.

In a further embodiment, for each of the runs of consecutive time units, either (i) all configurations except the configuration with the greatest amount of excess supply for each possible number of unmet demands during the run are removed from the current output set of configurations, or (ii) those configurations with an excess supply greater than an excess supply of a configuration with the smallest amount of excess supply that meets or exceeds a total supply deficit of all remaining runs within the timeframe are removed from the current output set of configurations.

In a further embodiment, a graphical user interface that shows the demands is displayed. An input is accepted through the graphical user interface that indicates that a particular demand is (i) required to be met, or (ii) required to be unmet. Any configuration that includes the particular demand is removed from the current output set of configurations of met and unmet demands in response to the indication that the particular demand is required to be met. Any configuration that does not include the particular demand is removed from the current output set of configurations of met and unmet demands in response to the indication that the particular demand is required to be unmet. Each of (i) identifying the one or more runs, (ii) identifying the set of maximal excess configurations, (iii) creating the current output set of configurations, and (iv) assigning the supply units is performed in response to the acceptance of the input.

In one embodiment, a non-transitory computer-readable medium storing computer-executable instructions is presented. When executed by at least a processor of a computer, the instructions cause the computer to perform the steps of one or more embodiments described herein.

In one embodiment, a computing system comprising a processor, a memory operably connected to the processor, and a non-transitory computer-readable medium operably connected to the processor and memory and storing computer-executable instructions is presented. When executed by at least the processor of the computing system, the instructions cause the computing system to perform the steps of one or more embodiments described herein.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
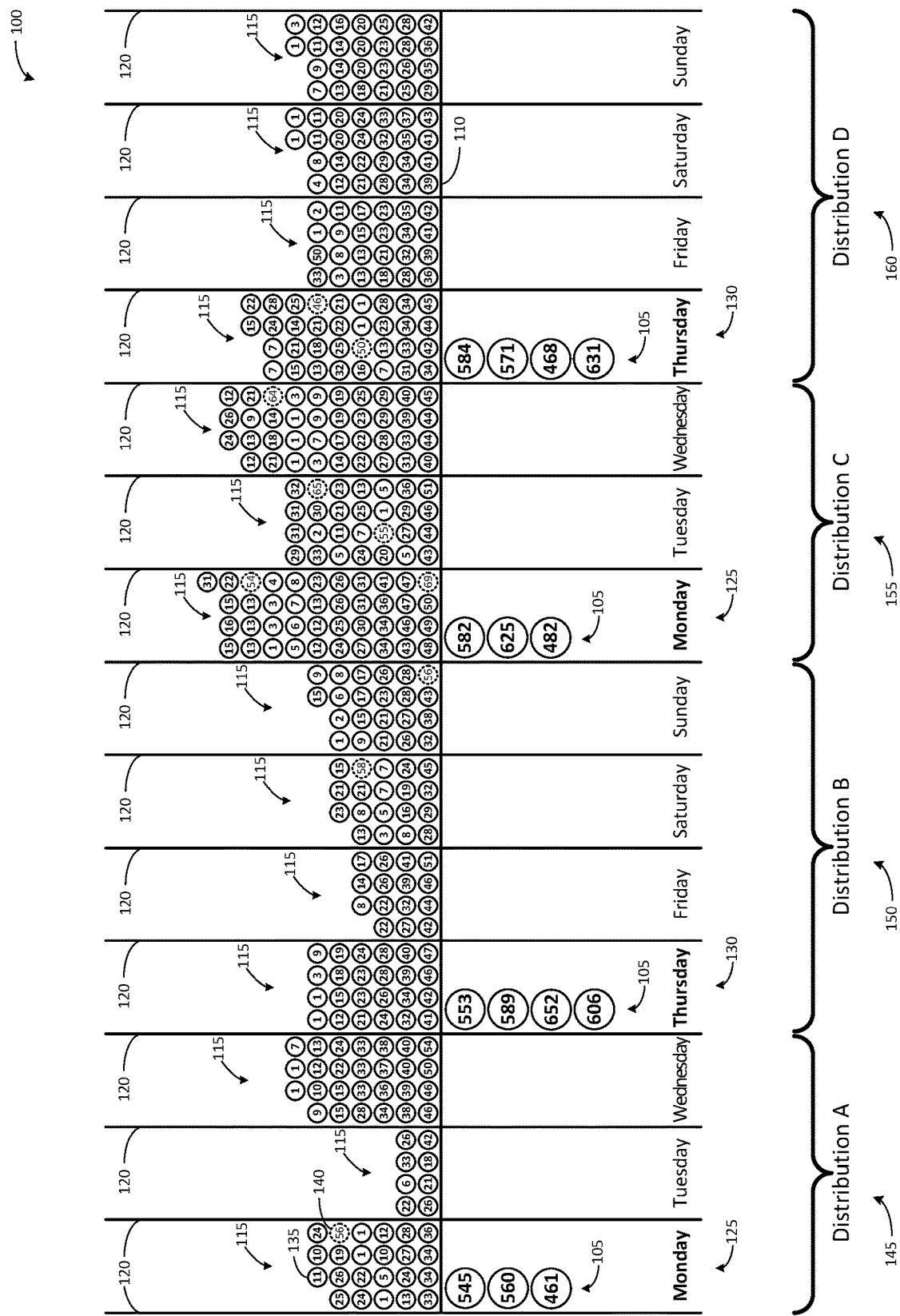
FIG. 1 illustrates one embodiment of a tool for representing and manipulating scheduled supplies and demands associated with minimizing unfilled demands due to short supply.

Systems and methods are described herein that act to minimize unfilled demands (unfulfilled orders) due to short supply in an order fulfillment context. Keeping unfilled demands to a minimum when there is insufficient supply to meet all demands eliminates the problems caused by unnecessarily unmet demands, such as reduced customer satisfaction, lost customer goodwill, and administrative cost. Also, when unmet demands are few in number, each unmet demand can be handled by a business as a special case: for example, the customer might be contacted to determine whether a later fulfillment date for an unmet demand is acceptable, or whether some split of the unmet demand can be arranged. For such reasons, it is important to minimize the number of unmet demands.

But, as discussed above, "eager" or "greedy" algorithms will not intentionally leave a larger demand unmet in order to fulfill two or more future smaller demands, permitting an excessive number of unmet demands. Instead, the systems and methods described herein intentionally bypasses fulfilling one demand when it determines that more demands can be met later by doing so.

The decision to intentionally neglect a demand is complex when those smaller demands are scattered among many demands of many sizes arriving over the coming weeks or even months, while other supplies are arriving as well. Keeping track of these scattered demands is itself beyond the ability of the human mind to practically perform. Further, making the decision to intentionally neglect any particular one of those demands, while fulfilling others, is even further beyond the practical ability of the human mind to perform. This is due at least to the volume of information, and also due to the constant change of information as new demands arrive.

The question arises: given a schedule of arriving supplies and arriving demands, what is the minimal cost (counted in unfilled orders) configuration matching the supplied units to demands? If there is sufficient supply to meet all demands the number of missed orders is zero when the system acts to minimize the number of unmet demands. In other words, the cost of matching supplied units to demands is simply a count of unmet demands. If the supply is fully sufficient to meet all demands, the task is trivial.

The problem becomes significant when there is a shortage. The problem is especially significant where customer schedules of the order fulfillment software routinely feature dozens of supply arrivals and hundreds or even thousands of demands. To minimize unfulfilled demands in the face of shortage, the system must determine what are the fewest demands that can be left unmet.

Determining a configuration of met and unmet orders for a given set of supplies and demands that is of minimal cost (in unmet orders) is combinatorically complex, and can take an unacceptably long time to complete.

These and other challenges are overcome by the systems and methods described herein.

—Example Order Fulfillment Tool—

FIG. 1 shows one embodiment of a tool 100 for representing and manipulating scheduled supplies and demands. In one embodiment, the tool is a graphical user interface (GUI). The tool visually presents a schedule of met and unmet demands that minimizes unmet demands when available supply is insufficient to meet all scheduled demands. Schedules that minimize unmet demands may be referred to as an 'optimal' solution.

The tool 100 depicts an example two weeks of supplies and demands. In the tool, supplies are represented by the larger circles 105 below the central time line 110, and demands are represented by the smaller circles 115 above the time line 110. The supplies 105 and demands 115 for each day are divided from the supplies 105 and demands 115 of other days by vertical lines 120. We can see in this example that supply 105 shipments arrive on Mondays 125 and Thursdays 130.

In one embodiment, met and unmet demands are visually distinguishable from each other in the tool 100. For example, met demands are depicted by circles with a continuous outline, as shown by example met demand 135. Further, unmet demands are depicted by circles with a broken or dashed outline, as shown by example unmet demand 140. In another example, met and unmet demands may be distinguishable by color—met demands may be depicted with green-filled circles, unmet demands may be depicted using yellow-filled circles.

In one embodiment, the user can drag and drop demands and supplies among the various days to see virtually instantaneous changes in the optimal choices for unmet demands if and when supply is not sufficient. The drag and drop operation will trigger operation of a method for determining and presenting (in the GUI) an optimal choice for unmet demands based on the new schedule indicated by the drag and drop operation.

In one embodiment, the user can also add (or delete) demands and supplies on the various days to see virtually instantaneous changes in the optimal choices for unmet demands if and when supply is not sufficient. The add (or delete) operation will trigger operation of an algorithm for determining and presenting (in the GUI) an optimal choice for unmet demands based on the new schedule indicated by the drag and drop operation.

Determining an optimal choice for unmet demands based on the schedule of demands and supplies is a kind of "assignment problem," and it could be set up as a classic optimization task for some integer programming tool. However, such programs can be slow, as the problem is combinatorically complex. Ideally, the software should be so fast that users can easily investigate "what if" scenarios by, for example, shifting supply arrival dates or speculating on future demands. Slow programs are generally not suitable for the virtually instantaneous changes in the display of optimal choices for unmet demands for this tool.

In general, there may be multiple configurations with the smallest cost (fewest unmet demands). Technically any one of these configurations would serve as an answer to this assignment problem. Accordingly, in one embodiment, the methods described herein provide at least one such minimal cost configuration. But, the multiple optimal configurations will typically differ in the amount of supply left over. As a secondary benefit, in one embodiment, the methods described herein provide that subset of lowest cost configurations that has the greatest remaining supply.

In the tool shown in FIG. 1, which is based on the techniques we describe herein, users can directly manipulate the supplies and demands to drag and drop them on different days. For example, when the user adds a new supply in the depicted situation, the demands' continuous- or dashed-outline circles (or green and yellow colors) change virtually instantaneously, as an optimal solution can be found in under 100 milliseconds. For comparison, finding an optimal solution for a problem half the size of the example presented in FIG. 1 using a classic integer programming tool on the same hardware is about 500 times slower than the methods described herein.

—Output Sets—

In one embodiment, the method provides an "output set" of all possible configurations of met and unmet demands among a schedule of all days leading up to and including a given day. That is, each day has an output set listing the configuration possibilities up to and including that day. Each entry of the output set represents one possible configuration of the demands up to that date. In one embodiment, the row holds a list of all unmet demands in that configuration. The cost of a row's configuration would be the number of unmet demands in that list. The row also holds a numeric value indicating the amount of excess supply available at the end of that day.

But, a simple brute force enumeration of all possible configurations of met and unmet demands can yield an unworkably huge number of configurations, approximately $2^N$ configurations where N is the total count of all scheduled demands. Limiting the number of supplies will reduce the number of feasible configurations, but there would still typically be on the order of $2^N$ configurations, an unworkably huge number. For example, trying to generate the output sets for the problem in FIG. 1 would exhaust the memory on computing devices with even the highest commercially available memory capacity. Accordingly, the size of the output sets should be reduced.

In one embodiment, the size of the output sets is vastly reduced by eliminating output set entries that (i) contribute only to sub-optimal configurations, or (ii) contribute to optimal configurations with lower amounts of remaining supply.

Once the output set from the final day of the schedule is determined, those rows with the fewest unmet demands can be selected as optimal solutions, and if desired, among those rows the subset with greatest remaining supply can be identified and selected.

—Distributions—

To construct the output sets, the series of days in a schedule should first be broken down into smaller series of consecutive days (or other runs of consecutive time units) into constructs referred to herein as a "Distribution." A Distribution is constructed by starting with a day that has arriving supply, then adding demands from all subsequent days with no supply, up until a day with supply is encountered. The resulting Distribution represents a run of consecutive days in which the first day has a supply, and the other days (if any) do not. The process is repeated until all the days in the schedule are gathered into Distributions. For example, in the schedule depicted in FIG. 1, the supplies and demands would be gathered into four distributions: Distribution A 145, Distribution B 150, Distribution C 155, and Distribution D 160.

Figure 2A:
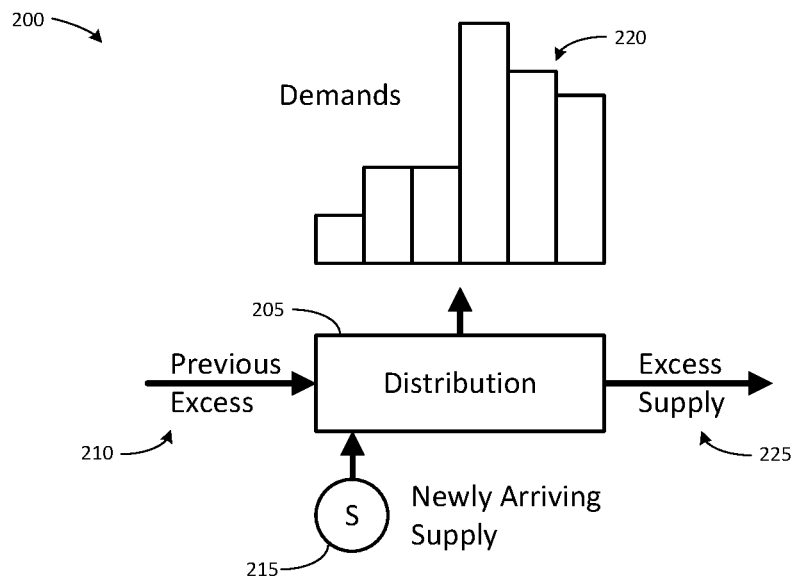
FIG. 2A illustrates one example diagram of the inputs and outputs of a Distribution of supplies to demands associated with minimizing unfilled demands due to short supply.

Referring now to FIG. 2, FIG. 2 shows one example diagram 200 of the inputs and outputs of a distribution 205. The distribution 205 accepts an excess supply 210 from a previous Distribution and any arriving supply S 215. The Distribution 205 allocates the combined excess supply 210 and arriving supply S 215, among a set of demands 220, and an excess supply 225 which may be fed into a next Distribution.

The arrival of demands at a certain time within a Distribution's time span is irrelevant to determining solutions with the fewest unmet demands (or maximizing remaining supply for those fewest unmet demands). Also, the exact number of supply deliveries that arrive on the first day of a Distribution is also irrelevant: those supplies can be lumped together, along with any previous excess held over from previous Distributions, into a single incoming supply value. A Distribution then consists of a single incoming supply value (such as arriving supply S 215) plus previous excess (such as excess supply 210), if any, a set of demands (such as set of demands 220), and an excess supply (such as excess supply 225) representing the number of units that the Distribution can pass on to the next Distribution.

It may not be immediately apparent that the packaging the demands and supplies over a series of days into Distributions saves work in determining the optimal configuration because an output set tends to grow as the product of the number of demands in each prior Distribution. But, by application of the techniques described herein, a day's contribution to its output set grows linearly, so combining days into a Distribution turns what would be a multiplicative product into a sum. This is a substantial savings in the memory and compute time demand placed on the system.

—Maximal Excess Configurations—

In one embodiment, a first technique to reduce the work in determining an optimal configuration is to limit possible configurations of met and unmet demands in a Distribution to the maximal excess configurations. Of all possible optimum configurations that have the highest possible number of met demands, there is a subset of those possible optimum configurations that also have the most excess supply. This may be referred to as a maximal excess configuration. By selecting only those optimal configurations that have the most excess supply, there is more supply available to find a solution for remaining unmet demands. Thus, in one embodiment, the maximally excess configurations subset of the optimal configurations are the only ones retained because they have the most flexibility for resolving unmet demands.

Consider for example all the configurations of met and unmet demands for some fixed Distribution. For each configuration C there is a set $C_m$ of one or more (N) maximal excess configurations ($C_m = \{C_{m1}, C_{m2}, \ldots, C_{mN}\}$) with the same cost: If configuration C has k unmet demands (cost k), then the set $C_m$ contains all the configurations ($C_{m1}$, $C_{m2}, \ldots, C_{mN}$) in which the k largest demands are unmet. Where there is more than one maximal excess configuration in the set $C_m$, each of the maximal excess configurations should be considered. (There can be more than one maximal excess configuration where there is a group of demands of the same size, and the remaining supply is only sufficient to fill some, but not all, of them.) If there is a group size G of same-sized, unfilled demands within the given Distribution, and n<G of them are met, there will be $G!/(n!(G-n)!)$ or "G choose n" ways to meet the demands, each of which is a maximal excess configuration. When constructing the local table, each of these configurations is included. Consequently, the final output set, which contains all the configurations emerging from the final Distribution, may contain many configurations with the same number of unmet demands and same amount of excess supply. These are alternative optimal solutions, all equally good, that represent permutations among the ways to fill a group of equal-sized demands. Retaining each of these configurations allows a user to explore the various alternative solutions and select from among them based on the user's personal preference. The user's personal preference may represent business logic known to the user, but not included in this system. Tools for exploring the alternate solutions are described elsewhere herein.

Note that the amount of supply required for a given maximal excess configuration $C_x$ is less than or equal to the amount required for any configuration of equal cost k (equal number of unmet demands). Therefore, if a Distribution's configuration C of cost k is feasibly met by the incoming supply total, then $C_x$ can also be met. Also, the amount of excess from a maximal excess configuration is greater than or equal to the excess from any configuration of equal cost (hence the name, "maximal excess configuration"). The supply passed forward from $C_x$ can therefore meet any demands that were met by the excess generated by C. Therefore, if a configuration C is part of a globally optimal (minimal cost) configuration across all Distributions in the series of days, then $C_x$ is also part of one (or more) global configurations of minimal cost. Consequently, only all possible maximal excess configurations need to be considered in order to find solutions with minimum cost.

Therefore, the output set for each Distribution should include only that Distribution's maximal excess configurations. By limiting consideration to the Distribution's maximal excess configurations, not all configurations of minimal cost are found, but rather only those configurations of minimal cost with maximal remaining supply. This ensures that only those optimal configurations that also have the most utility to satisfy other unmet demands are retained.

Considering only maximal excess configurations is a huge simplification, as there are only N maximal excess configurations for a Distribution with N−1 demands.

—Local Table and Output Set—

In one embodiment, in order to construct the output set for a Distribution, a local table for the Distribution is formed. The local table details all N+1 maximal excess configurations and their supply needs for the Distribution's N demands. In an initial Distribution (the first Distribution for a series of days) where there is no excess supply from a previous Distribution, the local table for the initial Distribution also serves as the output set for the initial Distribution.

In one embodiment, to generate the output set for a current Distribution, the local table of the current Distribution is combined with the output set from the previous Distribution (if there was a previous Distribution) to enumerate all the possible resulting combined configurations. Specifically, the rows of the resulting output set for the current Distribution consist of all ways to pair each entry of the output set of the previous Distribution with each entry of the local table for the current Distribution. To pair two entries, (i) the union of the sets of the unmet demands from each entry is constructed to serve as the unmet demands of the output set for the current Distribution, and (ii) the supply excess values from each entry is summed to serve as the resulting supply excess for the current Distribution.

Figure 2B:
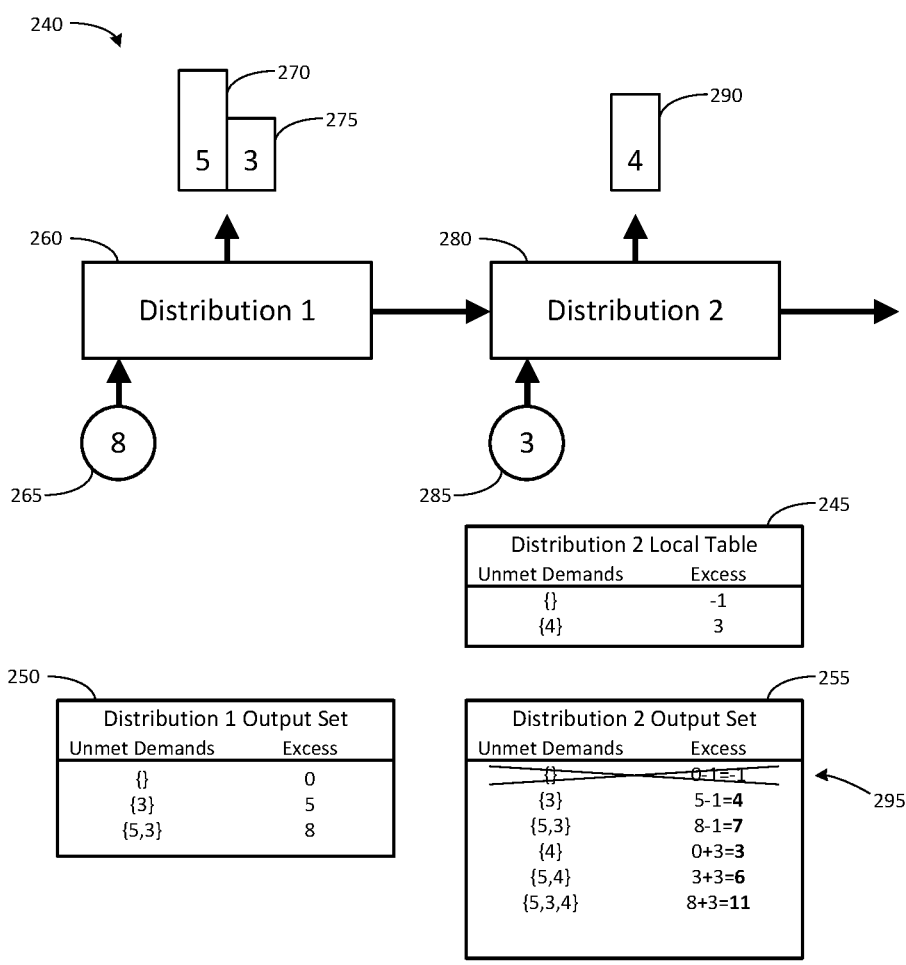
FIG. 2B is an example illustration of how a local table of a current Distribution is combined with a previous output set of a previous Distribution to give a resulting output set for the current Distribution.

FIG. 2B shows a simple example illustration 240 of how a local table 245 of a current Distribution combines with a previous output set 250 of a previous Distribution to give a resulting output set 255 for the current Distribution. For simplicity of appearance of the tables 245, 250, 255 in FIG. 3, the unique demands are identified by their demand size. In practice, the unique demands are represented as tuples including a unique identifier for the demand and the demand size, as demand size alone can be ambiguous.

Distribution 1 260 is an initial Distribution, and receives no excess supply (0 units) from a previous Distribution. Distribution 1 260 receives arriving supply 265 of 8 units. Distribution 1 260 may allocate up to 8 total units of supply to demands. Distribution 1 also includes two demands: a demand for 5 units 270 and a demand for 3 units 275.

Output set 250 describes the maximal excess configurations for the two demands 270, 275 of Distribution 1 260. As Distribution 1 260 is an initial Distribution, the output set 250 is identical to a local table (not shown) for Distribution 1 260. Note that the output set 250 has only 3 entries, not 4, due to the restriction to maximal excess configurations: the configuration for one unmet demand {5}, excess of 3, is excluded since there is a maximal excess configuration for one unmet demand {3}, excess of 5.

Distribution 2 280 receives arriving supply 285 of 3 units. Distribution 2 280 may also receive excess supply from Distribution 1 260. Distribution 2 also includes one demand: a demand for 4 units 290.

Local table 245 describes the maximal excess configurations for the demand 290 of distribution 2 280, without regard to any possible excess supply that may be received from Distribution 1 260. Note that a local table may have negative values in its excess column, such as shown for example by configuration for zero unmet demands { }, excess of −1. This simply means that some incoming supply of at least the same magnitude as the negative excess is needed to enable that configuration.

Output set 255 describes the maximal excess configurations for all demands (demands 270, 275, and 290) of Distribution 1 260 and Distribution 2 280. Note that while a local table for a Distribution can have negative excess, the output set for a Distribution cannot. Any negative excess entries are dropped from the output set, as shown at entry 295 of output set 255 because negative excess values represent configurations that cannot be met with existing supply.

The process for creating an output set may be repeated for any number of Distributions in a series of days, until the process is interrupted or the output set for the final Distribution is completed.

—Example Method for Minimizing Unfilled Demands—

In one embodiment, each step of computer-implemented methods described herein may be performed by a processor (such as processor 1410 as shown and described with reference to FIG. 14) of one or more computing devices (i) accessing memory (such as memory 1415 and/or other computing device components shown and described with reference to FIG. 14) and (ii) configured with logic to cause the system to execute the step of the method (such as unmet demand minimization logic 1430 shown and described with reference to FIG. 14). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1415, or storage/disks 1435 of computing device 1405 or remote computers 1465 shown and described with reference to FIG. 14).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 3:
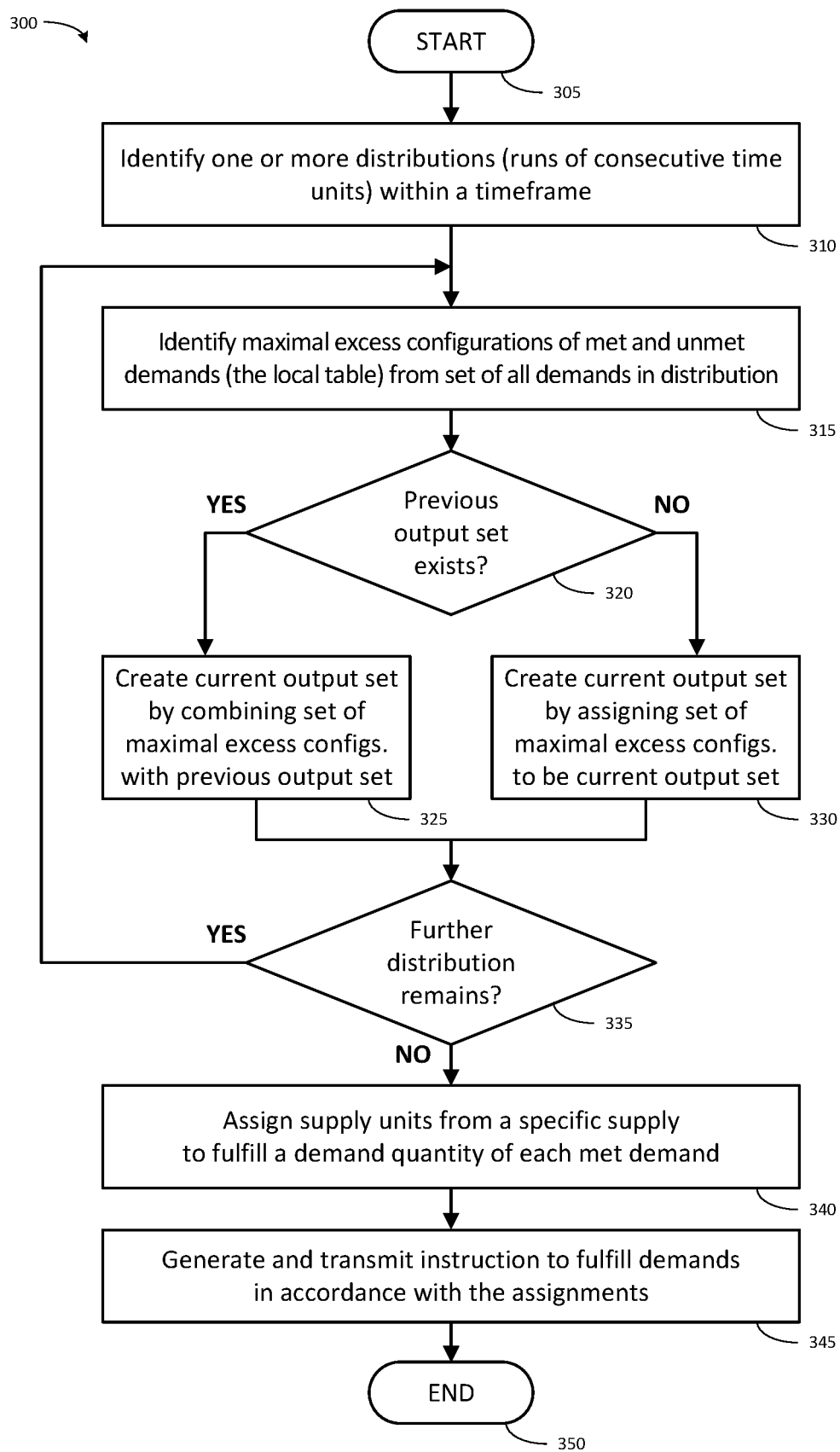
FIG. 3 illustrates one embodiment of a method associated with minimizing unfilled demands due to short supply.

FIG. 3 illustrates one embodiment of a method 300 associated with minimizing unfilled demands due to short supply. In one embodiment, the steps of method 300 are performed by unmet demand minimization server (or module) 1195 (as shown and described with reference to FIG. 11). In one embodiment, unmet demand minimization server 1195 is a special purpose computing device (such as computing device 1405) configured with unmet demand minimization logic 1405.

The method 300 may be initiated based on various triggers, such as receiving a signal over a network or parsing stored data indicating that (i) a user (or administrator) of the operations management system has initiated method 300, (ii) that that method 300 is scheduled to be initiated at defined times or time intervals, or (iii) that a user of a GUI associated with the method has performed an action in response to which the method 300 should be performed. The method 300 initiates at START block 305 in response to parsing a signal received or stored data retrieved and determining that the signal or stored data indicates that the method 300 should begin. Processing continues to process block 310.

At process block 310, the processor identifies one or more runs of consecutive time units within a timeframe, wherein (i) supplies of a product are added to a stock of the product and demands for the product are fulfilled from the stock of the product during the timeframe, and (ii) a run begins with a time unit that includes an addition of supply to the stock and includes all subsequent consecutive time units that do not include another addition of supply to the stock.

In one embodiment, the processor identifying one or more Distributions (or runs of consecutive days or other time units) within a timeframe, such as a span of days. Supplies of a product are added to a stock of the product and demands for the product are fulfilled from the stock of the product during the timeframe. A run begins with a day that includes an addition of supply to the stock and includes all subsequent consecutive days that do not include another addition of supply to the stock. The computing device thus breaks the timeframe into the one or more Distributions that occur within the timeframe.

In one embodiment, the processor accepts an input that defines the timeframe and stores it in memory. For example, the input may include a start date that indicates the first day of the timeframe, and an end date that indicates the last day of the timeframe. In one embodiment, the timeframe may be measured in days. In one embodiment, the timeframe may be measured in months, weeks, hours, or other periods that are appropriate for the type of business or goods for which the method 300 is implemented. In one embodiment, the input may be provided by a user of the operations management system. In one embodiment, the input may be included in a message received by the processor from another component of the operations management system. For example, the operations management system may be configured to automatically minimize unfilled demands due to short supply. The input may be provided in response to detecting that supply is not sufficient to fulfill all demands within the timeframe (detecting a short supply.

In one embodiment, the processor identifies (i) the supplies that arrive on each day (or other unit of time) of the timeframe, and (ii) the demands that occur on each day (or other unit of time) of the timeframe. In one embodiment, the processor parses a data structure that includes a record of the supply or demand to identify the supply or demand. These records may be stored, for example, in a data store associated with the operations management system. In one embodiment, each supply and demand has a unique identifier. In one embodiment, each supply and demand that the processor determines belong to a day (or other unit of time) of the timeframe may be stored in a data structure associated with that day (or other unit of time) of the timeframe, for example by recording the unique identifier of the supply or demand in the data structure, or by copying the supply or demand to the data structure.

In one embodiment, the processor parses the data structures of the days to determine which days include an arriving supply (or supply otherwise newly made available). In one embodiment, for each of those days, the data structure for that day, and the data structures for all consecutive subsequent days not including an arriving supply, if any, are used to form a further data structure representing that run of consecutive days. As discussed above, that run of consecutive days may be referred to as a "Distribution." Thus, the data structure for each Distribution has a record of each supply initially provided to it on its first day, and has a record of every demand made on that supply before a new supply is provided.

Once the processor has thus completed identifying one or more runs of consecutive time units within a timeframe, processing at process block 310 completes, and processing continues to process block 315.

At process block 315, the processor identifies a set of maximal excess configurations of met and unmet demands from a set of all demands for the product during the run.

In one embodiment, for each of the Distributions, a set of maximal excess configurations of met and unmet demands is identified by the processor for all of the demands that occur during the Distribution. This set may be stored as a "local table" (such as local table 245) data structure for the Distribution.

In one embodiment, the processor retrieves the quantity information for each supply and demand in the Distribution. The processor evaluates each possible combination of met and unmet demands for the Distribution in view of the supply available to the distribution. For each possible number of unmet demands, the processor stores a record of the maximal excess configuration for that number (the unmet demand of that size that yields the greatest excess) in a local table for the Distribution. The records of the maximal excess configuration include the size (item quantity) of the unmet demand(s), and the excess remaining. In one embodiment, the processor may evaluate each possible combination, and if the combination has a greater excess for the number of unmet demands than a record of another combination already in the table, it will replace that record with a new record of the combination with the greater excess, until all possible combinations are evaluated and the local table contains only records of maximal excess configurations. The local table is stored as a data structure in memory associated with the Distribution.

Once the processor has thus completed identifying a set of maximal excess configurations of met and unmet demands from a set of all demands for the product during the run, processing at process block 315 completes, and processing continues to decision block 320.

Blocks 320-330 show one embodiment of creating a current output set of configurations for the run. At decision block 320, the processor determines whether there is or is not a previous output set of maximal excess configurations for a previous run of consecutive time units.

For each of the Distributions, a current output set of configurations is to be created, but the method of creating the output set varies based on whether there is or is not a previous output set of maximal excess configurations for a previous Distribution.

In one embodiment, the processor retrieves the most recent entry in a data structure for all output sets for the timeframe. The processor parses the returned entry to determines whether the returned entry is NULL (there is no previous output set), or is an output set (there is a previous output set).

If the processor determines there is a previous output set of maximal excess configurations for a previous run of consecutive time units (YES), processing continues to process block 325. If the processor determines there is not a previous output set of maximal excess configurations for a previous run of consecutive time units (NO), processing continues to process block 330.

At process block 325, the processor creates a current output set of configurations by combining the set of maximal excess configurations with the previous output set.

Where there is a previous output set of maximal excess configurations for a previous Distribution (as is the case in all other Distributions in the timeframe except for the first Distribution in the timeframe) the set of maximal excess configurations is combined with the previous output set. In one embodiment, the processor performs a union operation which combines the records in the local table (the set of maximal excess configurations) with the records of the previous output set to create the current output set. The unified records of the current output set may be stored as an "output set" data structure in memory and associated with the Distribution.

Once the processor has thus completed creating a current output set of configurations by combining the set of maximal excess configurations (the local table) with the previous output set, processing at process block 325 completes, and processing continues to decision block 335.

At process block 330, the processor creates a current output set of configurations by assigning the set of maximal excess configurations to be the current output set.

Where there is no previous output set of maximal excess configurations for a previous Distribution (as is the case in the initial Distribution in the timeframe) the set of maximal excess configurations is assigned to be the current output set of configurations. In one embodiment, the local table is stored as an "output set" data structure in memory and associated with the Distribution. In another embodiment, the processor performs a union operation with the NULL set (the empty previous output set) to create the current output set. In one embodiment, the output set is constructed by considering all possible pairs of entries from the previous output set and the local table as follows: For each pair of entries, a new entry is formed by taking the union of the two unmet demand sets as the entry's unmet demand set, and by adding the two excess values to form the new entry's excess value. The resulting set of new entries are collected together to form the resulting output set.

Once the processor has thus completed creating a current output set of configurations by assigning the set of maximal excess configurations to be the current output set, processing at process block 330 completes, and processing continues to decision block 335.

At decision block 335, the processor determines whether there is or is not a subsequent run of consecutive time units remaining in the timeframe.

In one embodiment, the processor retrieves the Distribution data structure for the subsequent day. The processor parses the returned entry to determines whether the returned entry is NULL (there is no subsequent run of consecutive time units) or the user has requested a stop (the processor should not retrieve a subsequent run of consecutive time units, if any), or is a Distribution data structure (there is a subsequent run of consecutive time units).

If the processor determines there is a subsequent run of consecutive time units remaining in the timeframe (YES), processing returns to process block 315 to process the subsequent run. If the processor determines there is not a subsequent run of consecutive time units remaining in the timeframe, or that the user has requested a stop (NO), processing continues to process block 340.

At process block 340, for at least one configuration selected from a final output set for a final run within the timeframe, the processor assigns supply units from a specific supply to fulfill a demand quantity of each met demand.

Once a final output set is completed (either the output set for the final Distribution if the process runs uninterrupted or the last output set completed before the process is interrupted) the process has determined which demands will be met, which demands will be unmet, and the amount of remaining supply. In one embodiment, at this point, specific assignments of units from particular supply events to particular met demands are generated for each met demand. In one embodiment, the assignment is one or more tuples indicating a particular supply event, a particular met demand, and the quantity of units drawn from the particular supply event and given to the particular met demand. The assignments may be stored as a data structure. There may be assignments from a single supply event to multiple met demands, and from multiple particular supply events to a single met demand. Over all assignments to a single met demand, the quantity of units drawn is the total quantity required to fulfill the met demand. Over all assignments from a single supply event, the quantity of units drawn is the total quantity of units provided by the supply event.

Once the processor has thus completed assigning supply units from a specific supply to fulfill a demand quantity of each met demand for at least one configuration selected from a final output set for a final run within the timeframe, processing at process block 340 completes, and processing continues to decision block 345.

At process block 345, the processor transmits an instruction to fulfill demands over the timeframe in accordance with the assignments.

In one embodiment, once a current output set has been created for each Distribution in the timeframe, the processor selects one configuration from a final current output set created for the final Distribution in the timeframe. In one embodiment, the configuration selected is the configuration which has the fewest unmet demands and the greatest excess for that number of unmet demands. In one embodiment, the configuration selected is one configuration which has the fewest unmet demands, regardless of whether that configuration has the greatest excess for that number of unmet demands. The processor generates an instruction to fulfill demands over the timeframe in accordance with the selected configuration. That is, the instruction indicates that demands occurring within the range of days described by the timeframe should be filled or left unfilled as described in the configuration. The processor transmits the instruction within the operations management system to initiate operations to effect the fulfillment of the demands.

In another embodiment, where the steps for creating an output set for each Distribution is interrupted before an output set for the final Distribution of the timeline is created, the processor selects one configuration from a final current output set created before the interruption. In one embodiment, the configuration selected is the configuration which has the fewest unmet demands and the greatest excess for that number of unmet demands. In one embodiment, the configuration selected is one configuration which has the fewest unmet demands, regardless of whether that configuration has the greatest excess for that number of unmet demands. The processor generates an instruction to fulfill demands over the uninterrupted portion of the timeframe in accordance with the selected configuration. That is, the instruction indicates that demands occurring within the range of days from the beginning of the timeframe through the end of the last Distribution for which an output set was completed should be filled or left unfilled as described in the configuration. The processor transmits the instruction within the operations management system to initiate operations to effect the fulfillment of the demands.

In one embodiment, the instructions to initiate operations to effect the fulfillment of the demands may be directed directly or indirectly (through one or more servers such as web interface server 1145) to one or more modules of the integrated business server 1140. In one embodiment, in response to receiving the instructions to initiate operations to effect the fulfillment of the demands, the integrated business server 1140 may generate and transmit instructions that cause, for example: printing, display, or transmission (for example by email, fax, text, or other protocol) of warehouse pick and/or pack instructions to effect the fulfillment of the demands; printing display or transmission of delivery instructions to shippers to effect the delivery of units of the met demands; and one or more robots or other automated machines to retrieve units from a warehouse or other storage location, pack, and ship the units of the met demands.

Once the processor has thus completed transmitting an instruction to fulfill demands over the timeframe in accordance with the assignments, processing at process block 345 completes, and processing continues to END block 350, where method 300 ends.

—Efficient Frontier Culling—

In one embodiment, a second technique to reduce the work in determining an optimal configuration is to remove from an output set all maximal excess configurations which do not have the greatest amount of excess supply for each cost.

Figure 4A:
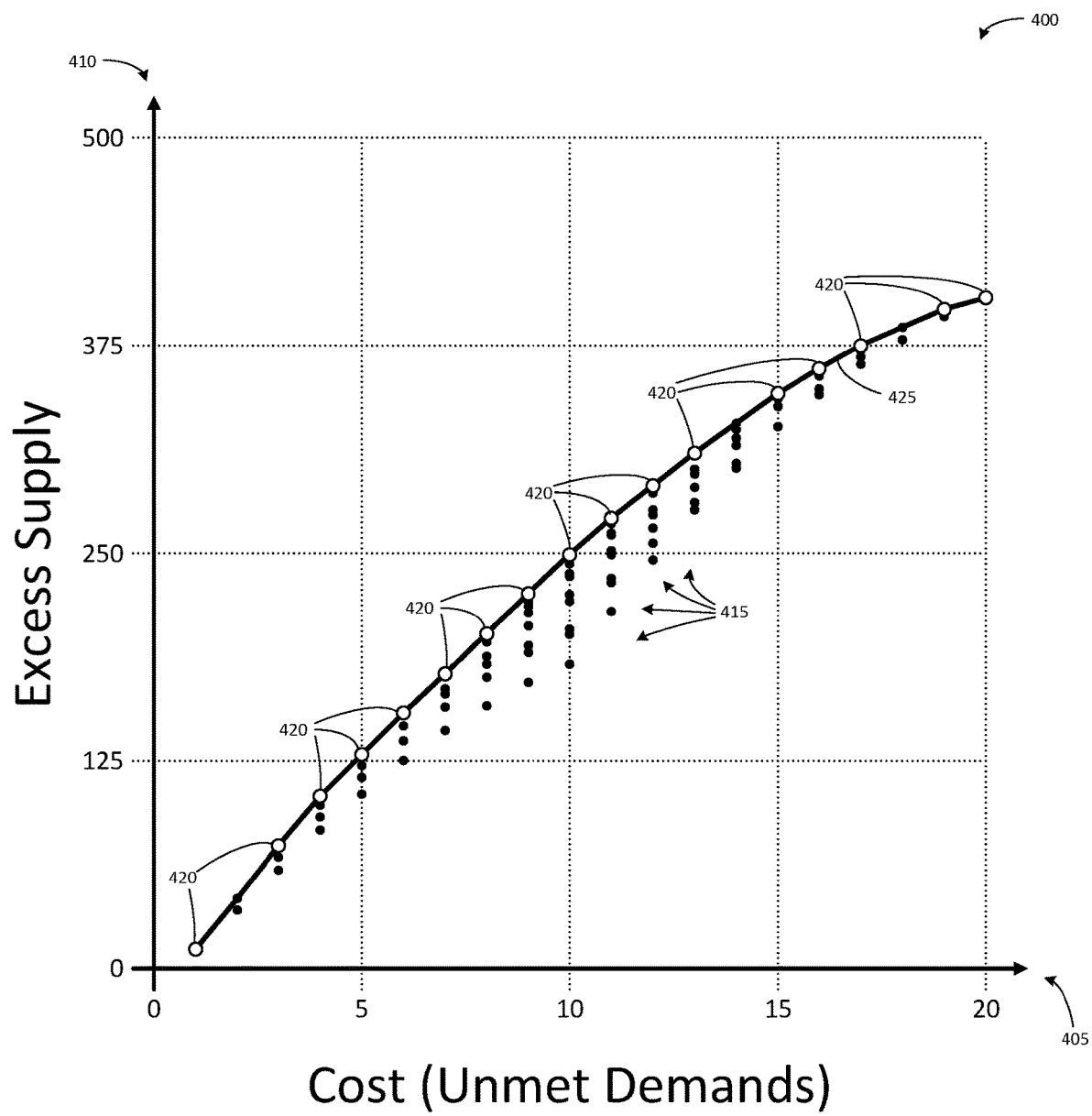
FIG. 4A illustrates an example plot illustrating efficient frontier culling of maximal excess configurations of met and unmet demands.

FIG. 4A shows an example plot 400 illustrating efficient frontier culling of maximal excess configurations of met and unmet demands. Plot 400 is of cost (unmet demands) against the supply excess for maximal excess configuration entries in an example output set (not shown). The cost of a maximal excess configuration is measured on the cost (unmet demands) axis 405. The excess supply of a maximal excess configuration is measured on the excess supply axis 410. Each maximal excess configuration in the example output set is plotted as a point 415 described by the number of unmet demands in that configuration, and the amount of excess supply.

Note that for any given cost there may be multiple maximal excess configurations with various amounts of excess supply. The greatest amount of excess supply for each cost is shown as an open point 420. The collection of open points 420 may be referred to as the "efficient frontier" 425. These configurations with highest excess could be able to supply all future demands supplied by the other configurations, and perhaps even more.

Accordingly, any table entries with less than the maximum excess supply for a given cost are eliminated from the output set, leaving those indicated by the open points 420. This will typically eliminate many entries that contribute only to sub-optimal configurations. This may also eliminate some entries that contribute to optimal configurations. But, none of the ruled-out configurations will have a cost lower than the configurations involving the highest excess entry. Further, none of the ruled-out configurations can have a resulting final excess greater than that arising from the entry with the maximum excess.

This elimination of output set elements may be referred to as "efficient frontier culling," as the set of remaining entries represent a tradeoff of cost vs. supply among optimal solutions, and such a tradeoff curve is often called an "efficient frontier." Efficient frontier culling can be applied to each output set and each local table as well.

Thus, efficient frontier culling further reduces the work in determining an optimal configuration by removing additional entries from an output set and therefore reducing the number of possible configurations to be calculated by computing hardware.

In one embodiment, the method 300 may include steps for efficient frontier culling. For each of the runs of consecutive time units, the processor removes from the current output set of configurations all configurations except the configuration with the greatest amount of excess supply for each possible number of unmet demands during the run. In one embodiment, these steps for efficient frontier culling follow alternative steps 325 and 330 and precede decision block 335. In one embodiment, these steps for efficient frontier culling precede the steps for assignment of units to met demands.

In one embodiment, the processor retrieves the output set for the Distribution from memory. For each possible number of unmet demands, the processor: (i) parses the output set to identify each configuration record for that number of unmet demands; (ii) determines which configuration record for that number of unmet demands has the greatest amount of excess supply; and (iii) deletes the other configuration records (if any) for that number of unmet demands.

—Future Deficit Culling—

Often the entries in an output set contain far more excess supply than is necessary to fulfill all future demand. Retaining entries that include more excess than necessary to fill every met demand wastes computing resources (such as memory and processor cycles), and causes unnecessary delay in completing the process and presenting solutions to the user. In one embodiment, a third technique to reduce the work in determining an optimal configuration is to delete those entries from the output set that include an unnecessarily large excess supply.

The amount of excess supply necessary is not simply the sum of all future demand minus the sum of all future supply. Supplies may arrive very late, and the demand may be early, so in actuality far more supply is needed than the simple difference in totals would indicate. In one embodiment, to avoid the problem of relative times for supplies and demands, by employing a technique referred to herein as "Future Deficit Culling."

In one embodiment, Future Deficit Culling is based on "local deficits" of the Distributions. Each Distribution has a "local deficit." The local deficit is simply the difference between the total of all demands in the Distribution and the local supply of the Distribution (that is, the supply excluding any incoming supply from the previous Distribution).

It is always possible for a Distribution to allocate its local supply to its own demands, so the configurations in which Distributions have the local deficit passed into them will always be feasible. If enough supply can be passed into the Distribution to fill all the future deficits, there would be enough supply to fill all future demands while adding no cost (unmet demands) beyond that already incurred.

It is possible to pass in even more than the minimal necessary to satisfy future deficits by selecting configurations plotted farther to the right on the efficient frontier curve 425 of FIG. 4A, but such configurations bring higher cost. Accordingly, all such entries can be deleted from the output set as they clearly can't be part of a minimal cost configuration. Configurations with less than the sum of future deficits should not be deleted, as they have low cost, and even though they will cause unmet demands in the future, those may be few in number and so part of an optimal configuration.

Note that future deficit culling is meaningfully applied to the output set, but not to the local table, because the local table refers only to the supply needs of the configuration of the associated Distribution and does not describe the excess that will be available from that Distribution.

Figure 4B:
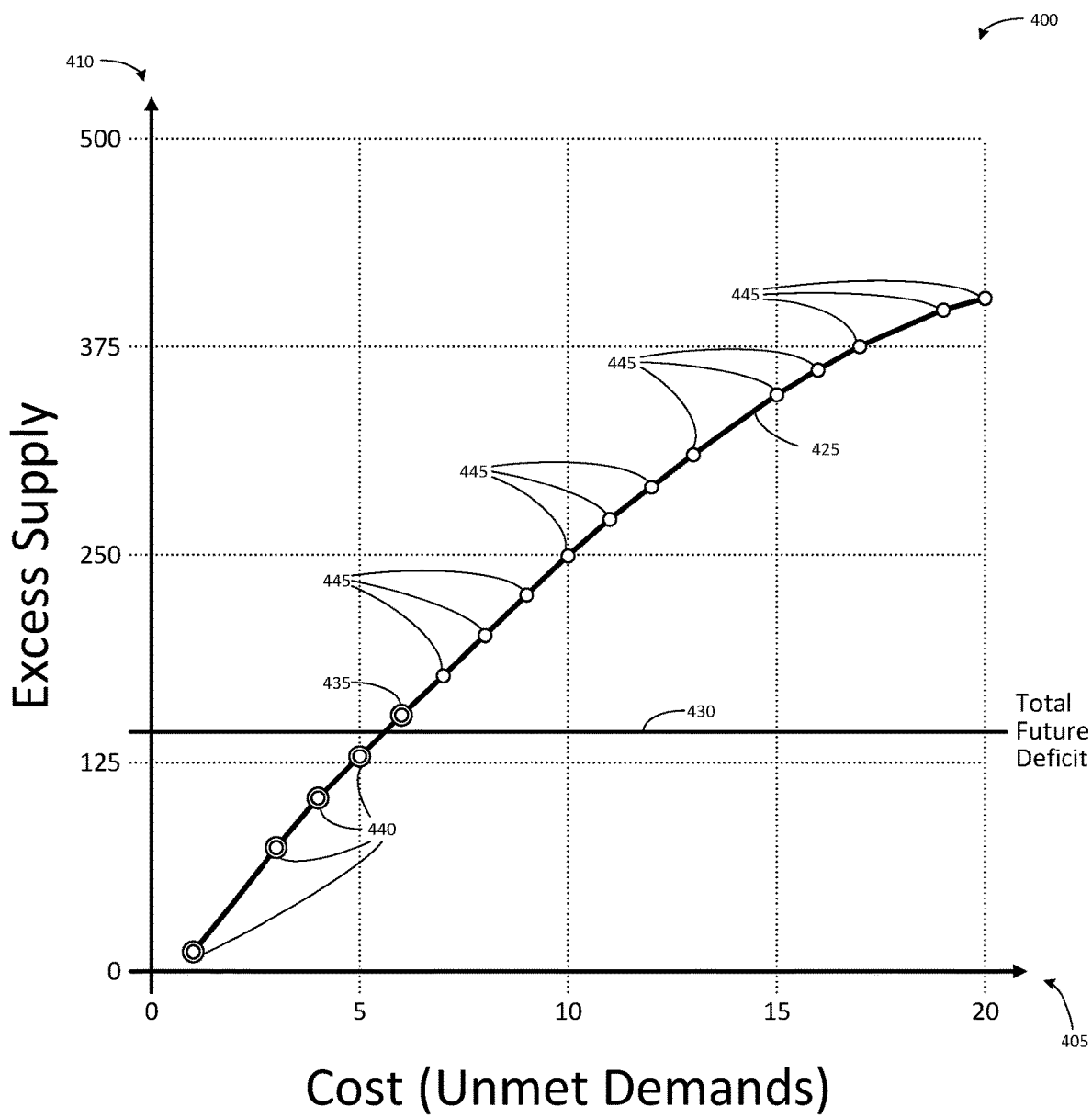
FIG. 4B illustrates an example plot illustrating future deficit culling of maximal excess configurations of met and unmet demands.

FIG. 4B shows the example plot 400 further illustrating future deficit culling of maximal excess configurations of met and unmet demands. FIG. 4B shows which entries remain in the example cost vs. excess plot 400 after both efficient frontier culling and future deficit culling of the output set. The points 415 for configurations that are not on the efficient frontier are removed from the plot 400. The total future deficit 430 of the series of days is shown on the plot 400. The configuration with the minimal amount of excess required to satisfy (meet or exceed) the total future deficit 430 is point 435. That is, this configuration has the smallest amount of excess supply of all the remaining configurations in the output set that is sufficient to meet or exceed the sum of all future deficits in the series of days. The configuration represented by point 435 is retained in the output set.

The configurations with less than the sum of future deficits are shown at points 440. The configurations represented by points 440 are retained in the output set. Even though these configurations are not able to cover all unmet demands, they may yet be part of an optimum configuration. For example, there may be a single large unfilled demand that makes up a large portion of the future deficit. It may be that each of these four points 440 have a relatively low excess relative to that single large demand. The configuration represented by point 435 would allow that single large unfilled demand to be filled. But, it may require 6 demands to be left unmet in order to fill this one large demand, whereas the leftmost of the points 440 requires leaving only one demand unmet. Accordingly, configurations may not need to satisfy all future deficit in order to be part of an optimum solution.

The configurations represented by points 445 exceed the minimum amount of excess supply needed to meet the total future deficit 430. These points 445 incur an unnecessarily high number of unmet demands and are removed from the output set. In short, all configurations that have an excess supply greater than the excess supply of the configuration with the smallest amount of excess supply that meets or exceeds the total future deficit 430 are unnecessarily excessive, and are culled.

In one embodiment, the method 300 may include steps for future deficit culling. For each of the runs of consecutive time units, the processor removes from the current output set of configurations those configurations with an excess supply greater than an excess supply of a configuration with the smallest amount of excess supply that meets or exceeds a total supply deficit of all remaining runs within the timeframe. In one embodiment, these steps for future deficit culling follow alternative steps 325 and 330 and precede decision block 335. In one example, these steps for future deficit culling also follow any steps for efficient frontier culling.

In one embodiment, the processor parses the data structures of each subsequent Distribution of the timeline to determine the total deficit between supplies and demands over the remainder of the timeline. The processor stores this total supply deficit in a data structure in memory. The processor retrieves the output set for the Distribution from memory. The processor: (i) parses each configuration record of the output set to identify a configuration record with a smallest amount of excess supply that is also greater than or equal to the total supply deficit; and (ii) deletes each configuration record of the output set that has an amount of excess supply greater than that smallest amount.

As visible in from FIGS. 4A and 4B, after both efficient frontier culling and future deficit culling have been applied to the example output set, the number of entries has been reduced from about 100 to 5. In one embodiment, after efficient frontier culling and future deficit culling, remaining final output set entries are evaluated to identify the configuration with the minimal amount of excess required to satisfy (meet or exceed) the total future deficit. Multiple such entries may be identified where there are alternative valid configurations. In the example represented shown in FIGS. 4A and 4B, this output set entry is represented by point 435.

In one embodiment, where there are alternative valid configurations, each of the possibilities may be presented for review of the user. In one embodiment, one of the alternative valid configurations is selected for display, and the other alternative configurations are not displayed until the system receives an input from the user that indicates that the user wishes to view another alternative configuration. The selection of the one valid configuration for initial display may be random, be based on the order in which the configurations are generated by the system (such as their order of appearance in the final output set), or be based on the satisfaction of a tie-breaker condition. The tie-breaker condition may include satisfaction of one or more orders for a particularly valued customer, such as a highest volume customer, most profitable customer, or customer paying the highest price per unit. The satisfaction of the tie-breaker condition may be evaluated based on information retrieved about one or more demands and/or comparison with a data structure describing one or more tie-breaker conditions. In one embodiment, these configurations may be ordered for display be in descending order of importance under the tie-breaker condition(s).

In one embodiment, the configuration with the minimal amount of excess required to satisfy (meet or exceed) the total future deficit may not be presented for user review. Instead, the system may automatically select this configuration for implementation, and generate and transmit instructions to implement this configuration without further input from the user. In one embodiment, where there are alternative valid configurations, the system may automatically select from among the alternative valid configurations on similar bases to those considered for selecting the initial configuration for display as discussed above, and the system will proceed to automatically select this configuration for implementation, and generate and transmit instructions to implement this configuration without further input from the user.

—Assignment of Units from Supply Events to Met Demands—

Figure 5:
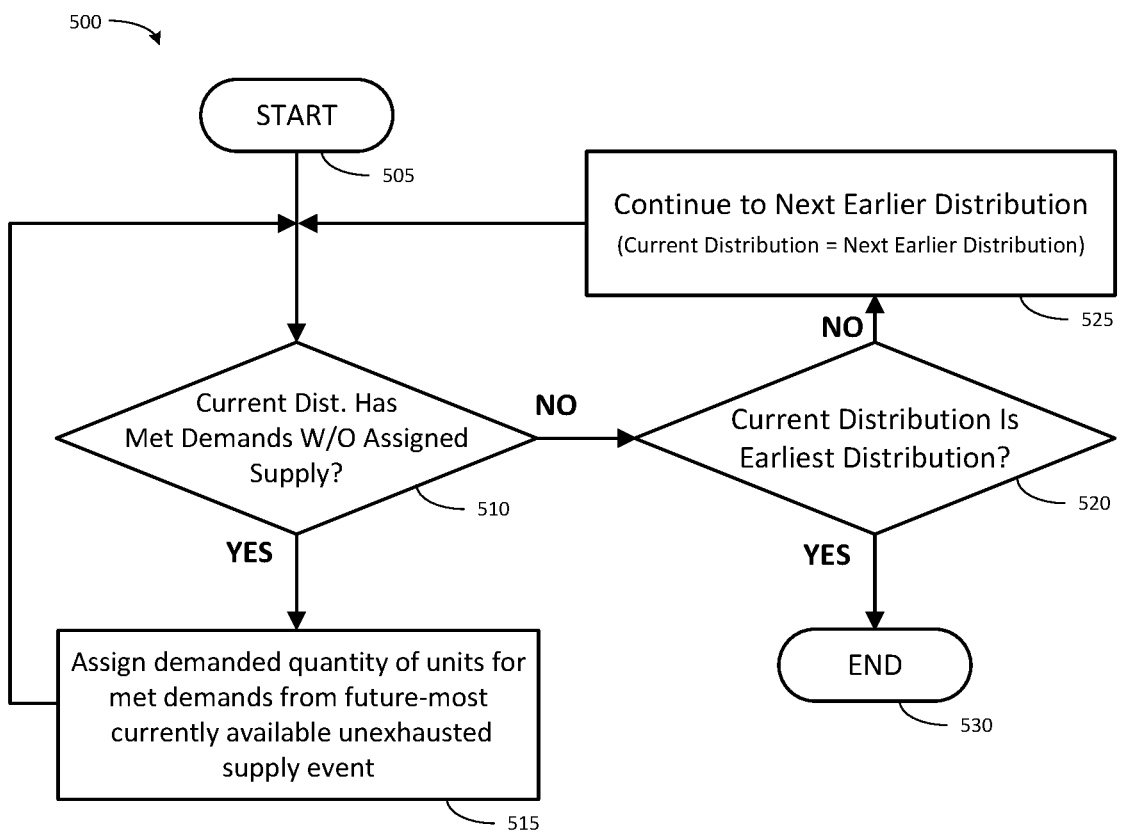
FIG. 5. illustrates one embodiment of a method for assigning supply units from a specific supply to fulfill a demand quantity of each met demand.

FIG. 5. shows one embodiment of a method 500 for assigning supply units from a specific supply to fulfill a demand quantity of each met demand. The method 500 initiates based on various triggers, such as receiving a signal over a network or parsing stored data indicating a request for to perform the assignment. In one embodiment, method 500 is performed as part of a larger process, such as method 300 as shown and described with reference to FIG. 3, where it is performed as part of step 340 of method 300. In one embodiment, the method is performed for at least one configuration of met and unmet demands selected from a final current output set for a final Distribution. The method 500 initiates at START block 505, where the current Distribution is set to the future-most (latest) Distribution in the timeframe, and continues to decision block 510.

At decision block 510, the processor determines whether the current Distribution has any met demands that have not been assigned their required allocation of supply units. Assignment between met demands and supply events is performed first for the future-most Distribution, and performed for each prior Distribution in turn through the initial Distribution. (Referring briefly to FIG. 1, this would cause the Distributions 145-160 to be handled from rightmost Distribution, Distribution D 160, leftward through each of Distribution C 155, Distribution B 150, and Distribution A 145 in turn.) Within the Distribution, it does not matter the order in which the met demands are assigned units. Note that the determination has already been made that the demands to which the units are assigned can be met from the supply events. Only met demands are going to be assigned units from available supply, so there is no risk of insufficient units. In one embodiment, the processor determines whether it has reached the end of a data structure such as a list of all unmet demands in the Distribution (after assigning supply units to all prior unmet demand entries). If there are met demands in the Distribution that have not been assigned their required demand quantity of supply units, processing at decision block 510 completes and processing continues to process block 515. If all met demands in the Distribution have been assigned their full demand quantity of supply units, processing at decision block 510 completes and continues to decision block 520.

At process block 515, the processor assigns supply units from a specific supply to satisfy a demand quantity of each met demand.

In one embodiment, (for each Distribution), units are assigned from the future-most unexhausted supply event until each met demand in the Distribution is assigned its demanded quantity of units. When there are no more unassigned units in a supply event and the supply event is exhausted. When a supply event is exhausted, units are assigned from the next future-most unexhausted supply event, repeating for each unexhausted supply event in turn, until all met demands in the Distribution are assigned a supply. In one embodiment, the processor stores an assignment as a data structure that indicates a particular supply event from which supply units are drawn, a particular met demand to which the units are supplied, and the quantity of units drawn from the particular supply event and given to the particular met demand. A count stored in memory of available units for the current supply may be decremented by the quantity of units drawn for each assignment.

In one embodiment, if all of the met demands of a Distribution are assigned a supply, and there are still remaining unassigned units in a supply event for the Distribution (the supply event is unexhausted), the leftover units are left unassigned, and contribute to the total excess over the entire Distribution.

Thus, in summary of one embodiment, in the future-most Distribution all the demands marked as met are filled first from whatever total supply is available only to that Distribution, and then if there are still demands marked met in the future-most Distribution that need to be filled, supply is pulled from the previous Distribution.

Once the processor has thus assigned supply units from a specific supply to satisfy a demand quantity of each met demand, processing at process block 515 completes, and processing returns to decision block 510.

At decision block 520, the processor determines if the current Distribution (the Distribution just determined to have all met demands assigned a full supply by decision block 510) is the earliest Distribution in the timeframe.

Once all the demands marked met in the future most Distribution are assigned a supply, the process moves on to the next most future-most Distribution in turn, until all demands marked met in all Distributions of the timeframe are assigned a complete supply of units. In one embodiment, the processor compares a recorded start date of the timeframe and a recorded start date of the current Distribution to determine if the current Distribution is the earliest possible Distribution in the timeframe. If the processor determines that the current Distribution is not the earliest Distribution in the timeframe, processing at decision block 520 completes, and processing continues to process block 525. At process block 525, the processor moves processing to the next future-most (next earlier) Distribution. Processing continues at process block 510. If, at decision block 520 the processor determines that the current Distribution is the earliest Distribution in the timeframe, processing continues to end block 530, where method 500 completes.

This reverse-temporal assignment process, working from future-most back towards the present, guarantees the most flexibility in assignment because the supply events are not all equal in ability to supply units to meet demands. The supply events are constrained by time—a supply event cannot be used to satisfy earlier demands. A supply event can only supply units to contemporaneous or future demands. For example, one cannot ship out today a widget that does not arrive until next Tuesday. The future-most supply event is the most constrained, and the units of the future-most supply event can be used to satisfy only the met demands of the future-most Distribution. Earlier supply events are progressively less constrained, until the earliest supply event is reached. The units of the earliest supply event can be used to satisfy the met demands of all the Distributions. Thus, in one embodiment, units from weaker (later) supply events are assigned preferentially over the units of stronger (earlier) supply events in order to conserve the units of the stronger supply events for use only when necessary. This assignment process conserves the units of earlier supply events, assigning a unit from an earlier supply event only when no unit from the supply event for a current Distribution is available.

—Requiring a Demand to be Met or Unmet—

A business may require that a particular demand to be met even if supplies are scarce. The user of the tool 100 may desire to consider the effect of requiring the particular demand to be met. The method described above can be modified to apply this constraint by eliminating local table rows that contain the particular demand in its list of unmet demands. The optimization method can then be applied to this smaller set of configurations to find a new optimum (if it exists).

Similarly, the user of the tool 100 may desire to investigate the effect of requiring a particular demand to be unmet. This can be accomplished by eliminating any rows from the local table that do not contain the particular demand.

Figure 6A:
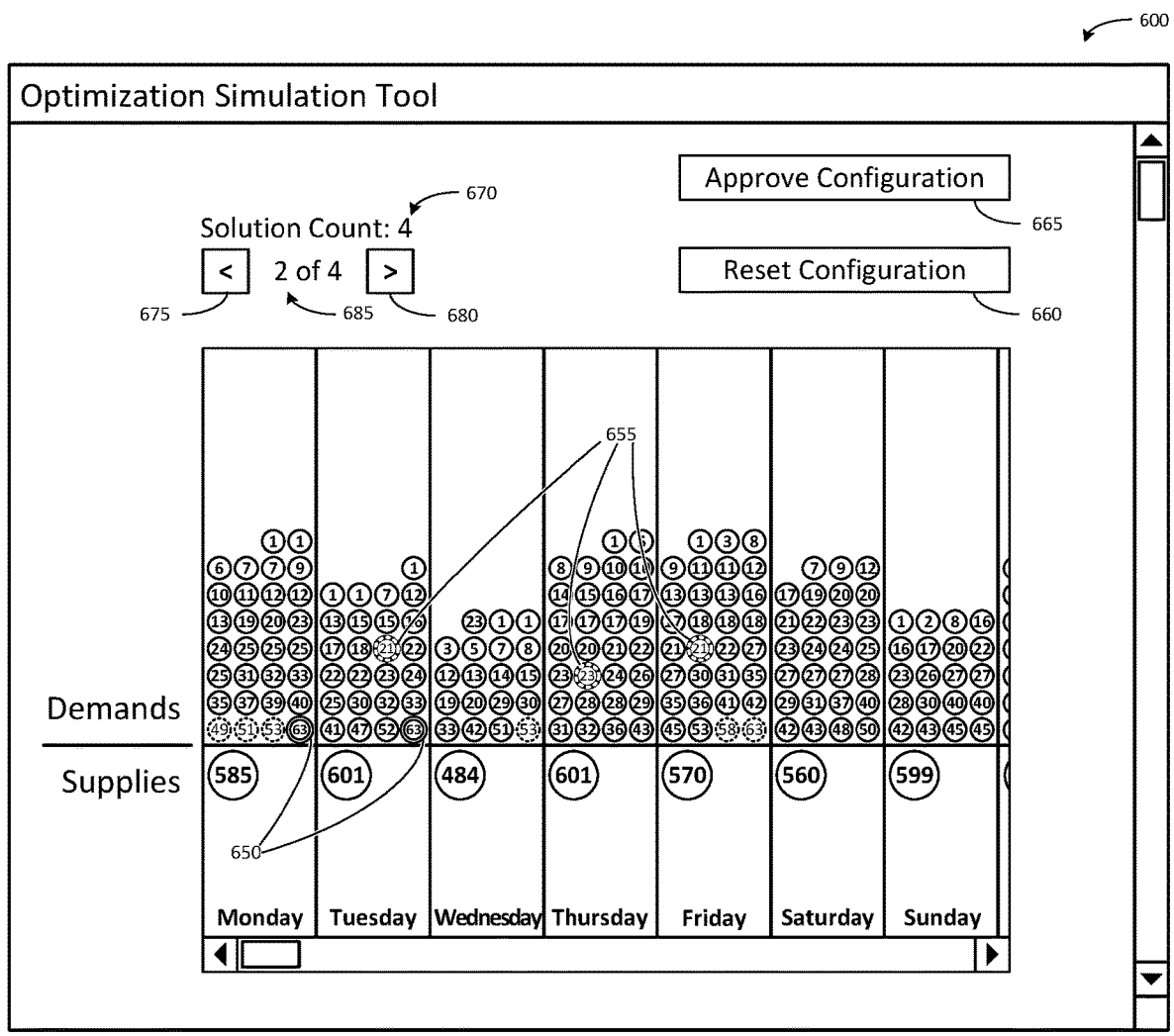
FIG. 6A illustrates one embodiment of a tool for representing and manipulating scheduled supplies and demands associated with minimizing unfilled demands due to short supply using a graphical user interface.

FIG. 6A shows one embodiment of a tool 600 for representing and manipulating scheduled supplies and demands in a GUI. In this embodiment, a user may interact with the tool 600 to require demands to be met or unmet.

The user may require a demand to be met by marking it as required to be met using the tool 600. In one embodiment, to effect this requirement the processor may remove from the current output set of configurations of met and unmet demands any configuration that include a particular demand in response to parsing an indication that the particular demand is required to be met.

Figure 6B:
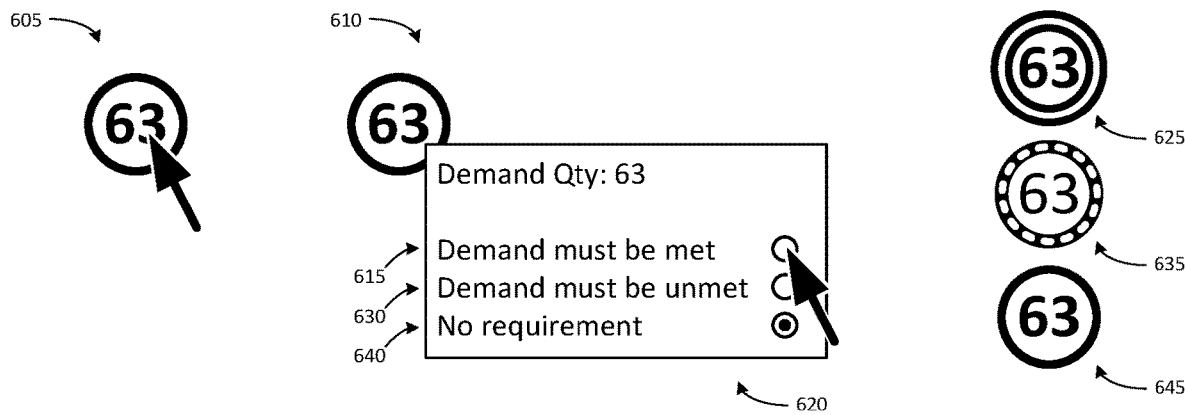
FIG. 6B illustrates enlarged views of example interactions with the tool to mark a particular example demand to be met or unmet.

FIG. 6B shows enlarged views of example interactions with the tool to mark a particular example demand to be met or unmet. For example, the tool 600 may receive a user requirement that a particular demand must be met by receiving a mouse click on a demand circle (or other icon) associated with the particular demand 605, displaying a menu 610 including an option to require that the demand be met 615, receiving a mouse click indicating a selection 620 of the option requiring that the demand be met 615, and storing that requirement in a data structure associated with the series of days, the Distribution including the demand, the demand, or other suitable storage location. The tool 600 may further display a visual indication that the demand is required to be met 625, for example by including a double border around the demand circle, or adding a colored border, such as a blue border, to the demand circle.

The user may also require a demand to be unmet met by marking it as required to be unmet using the tool 600. In one embodiment, to effect this requirement the processor may remove from the current output set of configurations of met and unmet demands (that is, the output set) any configuration that does not include the particular demand in response to parsing an indication that the particular demand is required to be unmet.

For example, the tool 600 may receive a user requirement that a particular demand must be unmet by receiving a mouse click on a demand circle associated with the particular demand 605, displaying a menu 610 including an option to require that the demand be unmet 630, receiving a mouse click indicating a selection 620 of the option requiring that the demand be unmet 630, and storing that requirement in a data structure associated with the series of days, the Distribution including the demand, the demand, or other suitable storage location. The tool 600 may further display a visual indication that the demand is required to be unmet 635, for example by including a outline-dotted border around the demand circle, or adding a colored border, such as a red border, to the demand circle.

It is possible that a user may require more demands to be met than is possible with the available supply. In this situation, there is no configuration that of met and unmet demands that satisfies these constraints (that is, there is no solution). When there is no configuration that satisfies these constraints, every supply excess entry in the final output set is negative. In one embodiment, the system detects that there is no configuration that will allow all required demands to be met by detecting that the final output set has only negative supply excess entries. For example, the system parses the supply excess entries of the final output set and determining that the final output set has only negative supply excess entries. In one embodiment, in response to the detection that there is no solution, an alert indicating the absence of available configurations is presented in the user interface. For example, a pop-up alert may be displayed that states that there is no solution or that no configurations will satisfy the user's requirements.

The user may also remove a requirement that a demand be met or unmet by removing the requirement using the tool 600. For example, the tool 600 may receive a user removal of a requirement that a particular demand must be met or unmet by receiving a mouse click on a demand circle associated with the particular demand 605, displaying a menu 610 including an option to remove any requirement that the demand be met or unmet 640, receiving a mouse click indicating a selection 620 of the option removing the requirement 640, and storing the state of being without requirement in a data structure associated with the series of days, the Distribution including the demand, the demand, or other suitable storage location. The tool 600 may further display a visual indication that the demand is not required to be met or unmet 645, for example by displaying the demand circle with the visual indications indicating that the demand is met or unmet, as shown and described with reference to FIG. 1.

The mouse clicks used for these interactions may include a standard click, such as a left-click, and a variety of alternative clicks, such as a right-click or an option-click.

In one embodiment, the "no-requirement" state as to whether a demand must be met or unmet is the default state of all demands. In another embodiment, one or more demands may have a default state of being required to be met or unmet, based on logic configured by the user of the tool 600. For example, a business may wish to always fill every order of a highly valued customer. The user may configure the tool 600 to configure demands associated with the highly valued customer to be in a default state of being required to be met, and the demand circles will be displayed by the GUI accordingly.

Referring again to FIG. 6A, the tool 600 is in a configuration in which the user has marked two demands as required to be met 650, and three demands as required to be unmet 655.

In one embodiment, the tool 600 includes a "reset configuration" button 660. In response to a selection of this button, the processor will revert each displayed supply and demand to the state and location it was in when first displayed.

In one embodiment, the tool 600 includes an "approve configuration" button 665. In one embodiment, selecting the "approve configuration" button 665 acts to select one configuration from the final current output set. In response to a selection of this button, the processor will initiate processing the steps for transmitting an instruction to fulfill demands in accordance with the configuration displayed in the tool.

For example, the processor may generate and transmit one or more REST requests to a web interface server (such as web interface server 1145, as shown in and described with reference to FIG. 11). In one embodiment, the REST request is configured to include all changes indicated by the user's manipulation of the tool by the user, including, but not limited to, the approved configuration of met and unmet demands, the requirements that a demand be met or unmet, any change in schedule for a demand or supply, and change in priority given to a demand. In another embodiment, all changes indicated by the user's manipulation of the tool are submitted as REST requests as they are made by the user, and the rest request generated and transmitted in response to the selection of the approve configuration button is an approval of the changes made in these requests. In either case, the REST request is configured to cause the Web Interface Server 1145 and/or the unmet demand minimization server 1195 to direct the appropriate module(s) of the integrated business server 1140 to effect the changes indicated by the user's manipulation of the tool. In one embodiment, the appropriate modules of the integrated business server include the ERP module 1155, the inventory management and distribution module, the order processing module, and/or the supply chain management module. The specific format of requests transmitted to the server may vary based on implementation.

In one embodiment, the tool 600 includes a display of the number of solutions 670. This number represents the number of possible equally valid configurations with the same least number of unmet demands. Each of these solutions is arbitrarily provided with a sequential number to act as an identifier for the solution, for example by assigning the numbers in sequence as each solution is identified. The displayed number of solutions 670 may be associated with previous solution button 675 and next solution button 680. An indicator number 685 that shows the identifier associated with the current solution is also displayed to inform the user which solution is currently being viewed. In response to a selection of the previous solution 675 button, the processor executes instructions to cause the configuration displayed in the tool to be replaced by a configuration assigned the next lower identifier number, and the indicator number to be updated. In response to a selection of the next solution 680 button, the processor executes instructions to cause the configuration displayed in the tool to be replaced by a configuration assigned the next higher identifier number, and the indicator number to be updated.

Figure 6C:
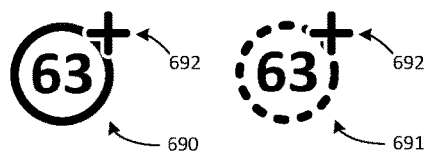
FIG. 6C illustrates enlarged views of example additional information about demands shown by the tool.

FIG. 6C shows enlarged views of example additional information about demands shown by the tool 600. In one embodiment, demand circles (or other icons) that indicate that a demand is met or unmet may include a further indication that they are involved in alternate solutions. For example, where the met demands are depicted with green-filled circles, a green-filled circle may be tinted toward yellow to indicate that in an alternate solution, the demand represented by this circle is unmet. Similarly, where the unmet demands are depicted with yellow-filled circles, a yellow-filled circle may be tinted toward green to indicate that in an alternate solution, the demand represented by this circle is met. In one embodiment, where met demands are depicted by circles with a continuous outline (such as met demand circle 690), and unmet demands are depicted by circles with a broken or dashed outline (such as unmet demand circle 691), the fact that a demand may have an opposite status in an alternate solution may be indicated by adding a further graphical indicator 692 to the circle representing that demand. The indication that a demand represented by a circle is involved in an alternate solution may also be applied to demands that are required to be met or to remain unmet by similar means. Thus, the user can readily see when viewing the tool 600 that a demand the user may have been worried about leaving unmet would be met in an alternate solution, and can assess the demands that would be left unmet in the alternate solution. The user can click through the various alternate solutions using the previous solution button 675 and next solution button 680 to arrive at one of the optimal solutions where the demand is met.

Figure 6D:
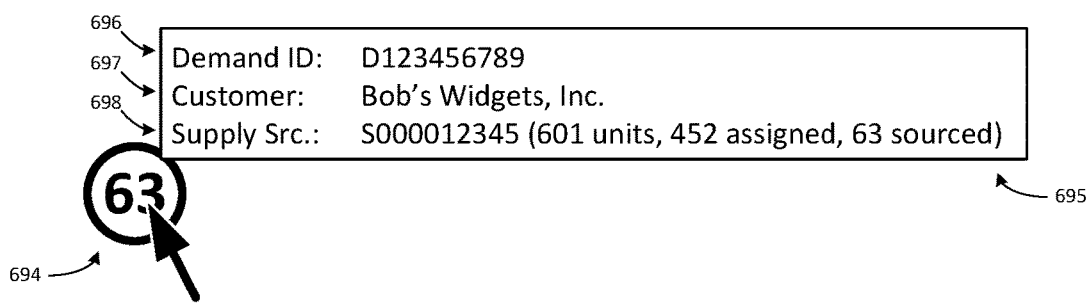
FIG. 6D illustrates shows enlarged views of example interactions with the simulation tool to cause information about a particular example demand to be displayed.

FIG. 6D shows enlarged views of example interactions with the tool to cause information about a particular example demand to be displayed. In one embodiment, the tool 600 provides additional information about an example demand in response to interaction with an example demand circle (or other icon) 694 associated with the example demand. In one embodiment, the tool 600 may detect a mouse (cursor) hover over or receive a mouse click on the example demand circle 694 associated with the example demand. In response to the click or hover, the tool 600 displays a pop-up 695 that provides additional information about the example demand that may be useful to the user in evaluating a solution and determining whether the demand should be met or unmet. In one embodiment, the pop-up 695 may display a demand identifier number 696. Demand identifier number 696 uniquely identifies the example demand represented by demand circle 694. Demand identifier number 696 may also be associated with a purchase order or other document. The displayed demand identifier number 696 may act as a hyperlink to the purchase order or other document. In one embodiment, the pop-up 695 may display the name of a customer (or shipping destination) 697 associated with the example demand. The displayed name of the customer 697 may act as a hyperlink, which on mouseover or on mouse click will cause the tool 600 to highlight all demand circles associated with the customer. In one embodiment, the pop-up 695 may display one or more unique identifiers of the supply source (or sources) 698 that the example demand draws from. Further, statistics such as the size of the supply, the number of units of that supply which are assigned to demands, and the quantity of units sourced from the example demand from that supply may also be displayed. In one embodiment, detect a mouse hover over or receive a mouse click on the example demand circle 694 associated with the example demand, the tool 600 highlights all supply circles representing supplies that provide units to the example demand. In one embodiment, the pop-up 695 may display an indication of a priority level for the demand represented by demand circle 694. In one embodiment, the pop-up 695 may display the demand quantity for the demand represented by demand circle 694. In one example, this information may be retrieved from a database associated with Integrated business server 1140.

Similarly, reciprocal information may be provided in response to detecting a mouse hover over or receiving a mouse click on a supply circle (or other graphical representation) associated with a particular supply. For example, in response to the hover or click interaction with the supply circle, the tool 600 may display a pop-up and/or highlight all demand circles that draw units from the particular supply. The pop-up may include such information as unique identifier for the particular supply, a vendor name, manufacturer name, or other description of the source of supply, the number of units assigned to demands and/or remaining un-assigned units, a date of origin for the supply, and a listing of one or more demands that draw units from the supply. The listing of demands may include further detail as to the quantity supplied to each demand. In one example, this information may be retrieved from a database associated with Integrated business server 1140.

Figure 7:
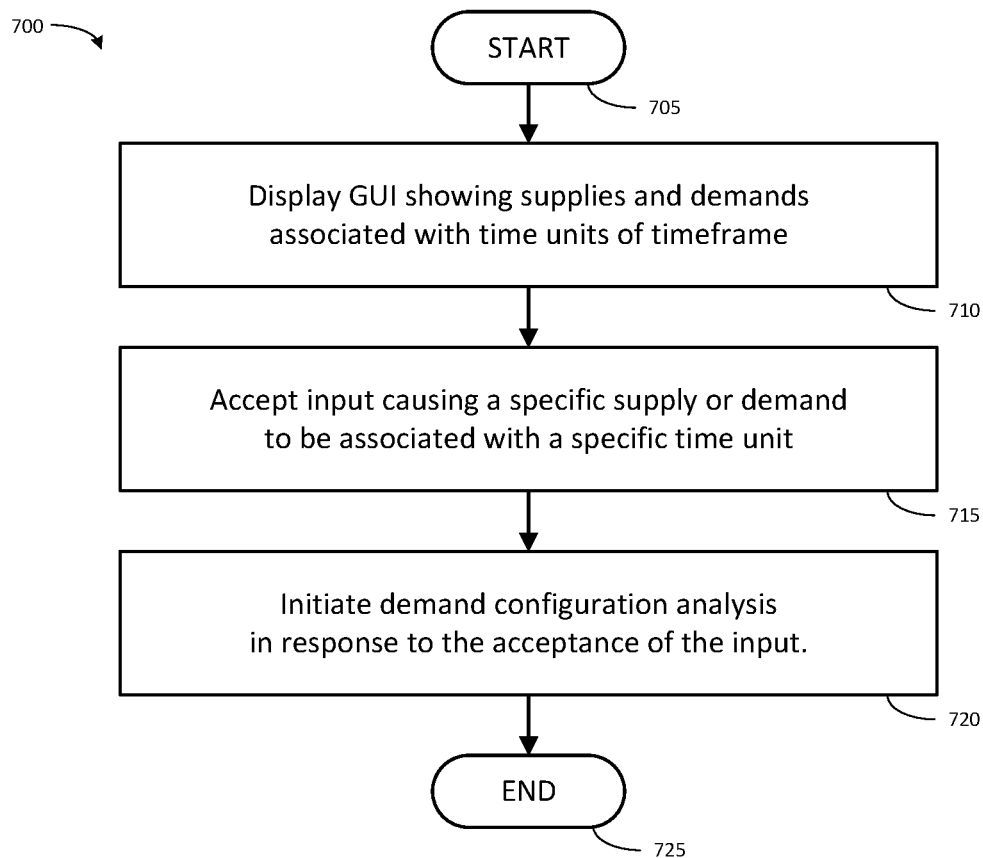
FIG. 7 illustrates one embodiment of a method for operating a graphical user interface tool associated with minimizing unfilled demands due to short supply.

In an example, the highlighting may be a brightening or change of the color of the supply/demand circle, or a boldening of the border of the circle. The supply to demand relationship may be one to many, many to many, many to one, or one to one, and the displayed highlights may reflect these relationships. FIG. 7. shows one embodiment of a method 700 for operating a GUI tool (such as tools 100 and 600) associated with minimizing unfilled demands due to short supply. The method 700 may be initiated based on various triggers, such as receiving a signal over a network or parsing stored data indicating a request for the GUI tool. In one embodiment, method 700 is initiated as part of a larger process, such as method 300 as shown and described with reference to FIG. 3. In one embodiment, the steps of method 700 precede the steps of method 300. The method 700 initiates at START block 705 in response to parsing a signal received or stored data retrieved and determining that the signal or stored data indicates that the method 700 should begin. Processing continues to process block 710.

At process block 710, the processor displays a graphical user interface that shows the supplies and demands associated with each time unit of the timeframe.

In one embodiment, for each time unit (for example, a day) of the time frame, the processor retrieves the unique identifier and size element of each demand associated with that day. For example, the processor may retrieve each supply and demand entry in a data structure associated with that day, and parse the entry for the unique identifier and the size element. The processor generates instructions configured to cause a display device (such as display device 1470) to create a visual representation of the timeframe (such as tools 100, 600, and 900). The visual representation includes subdivisions of the timeframe for the time units (days), and a visual representation (such as an icon, circle, or other suitable image) for each supply and demand of every day in the time frame. The visual representation for each supply and/or demand is located within the subdivision of the timeframe for the time unit (day) associated with that supply and/or demand. For example, where the visual representation of a supply is a circle, a supply circle is included in a subdivision of the time frame for the time unit (day) when the supply becomes available. Similarly, for a representation of a demand as a circle, a demand circle is included in a subdivision of the time frame for the time unit (day) when the demand should be met. In one embodiment, the supply and demand circles (or other visual representations) display the size element of the supply or demand. The processor associates the unique identifier of each visual representation of a supply or demand with the visual representation for later reference. The processor then transmits the instructions to a display device associated with a client (such as clients 1205) of the operations management system to cause the visual representations to be displayed. In one embodiment, this transmission may be directly to a display device of the computing device associated with the processor. In another embodiment, this transmission may be over a network to a client computer (such as clients 1205). Additional details of the graphical user interface are described elsewhere herein, for example with reference to FIGS. 12 and 13A-13C.

Once the processor has thus completed displaying a graphical user interface that shows the supplies and demands associated with each time unit of the timeframe, processing at process block 710 completes, and processing continues to process block 715.

At process block 715, the processor accepts an input through the graphical user interface that causes a supply or demand to be associated with a specific time unit of the timeframe.

In one embodiment, the processor accepts a drag-and-drop operation performed on a visual representation of a specific supply or demand. The visual representation of the specific supply or demand is dragged (for example by clicking and holding a mouse button while moving the cursor) from a first subdivision of the timeframe associated with a first time unit (day) to a second subdivision of the timeframe associated with a second time unit (day); and dropped into that second subdivision (for example by releasing the mouse button while the cursor is within the second subdivision). In response to this drag-and-drop operation, the processor removes the entry for the specific supply or demand from the data structure associated with the first time unit (day), and adds the entry for the specific supply or demand to the data structure associated with the second time unit (day).

In another embodiment, the processor accepts a menu selection indicating that an entry for the specific supply or demand should be moved from a first subdivision of the timeframe associated with a first time unit (day) to a second subdivision of the timeframe associated with a second time unit (day). For example, the menu selection may be a selection of the second time unit as a destination for the specific supply or demand. In response to this menu selection, the processor removes the entry for the specific supply or demand from the data structure associated with the first time unit (day), and adds the entry for the specific supply or demand to the data structure associated with the second time unit (day). The menu selection method may be preferred over the drag-and-drop method when the display of the timeframe is too wide to appear all at once on a display in the GUI.

In one embodiment, the change in time frame association may be recorded in a data structure for later reversal. For example, the processor may accept the selection of an "undo" button. In response, the processor executes an "undo" function which returns the entry for the specific supply or demand to the data structure associated with the first time unit (day) and removes it from the data structure associated with the second time unit (day).

In another embodiment, all such changes may be reversed in response to a single input. The processor may accept the selection of a "Reset Configuration" button, such as button 660 in the GUI. In response, the processor executes a reset configuration button which returns every supply or demand entry to the data structure associated with the time unit from which it was first moved, placing the configuration of met and unmet demands in the configuration that was initially displayed to the user.

Once the processor has thus completed accepting an input through the graphical user interface that causes a supply or demand to be associated with a specific time unit of the timeframe, processing at process block 715 completes, and processing continues to process block 720.

At process block 720, the processor initiates identifying the one or more runs, identifying the set of maximal excess configurations, creating the current output set of configurations, and assigning the supply in response to the acceptance of the input.

After accepting the input, the processor initiates the demand configuration analysis functions (the functions for identifying one or more runs, identifying a set of maximal excess configurations, creating a current output set of configurations, and assigning the supply). The processor then causes the graphical user interface to be re-displayed (or refreshed) in accordance with process block 710 above. The processor thus causes the graphical user interface to display the configuration of met and unmet demands resulting from the input.

Once the processor has thus completed initiating identifying the one or more runs, identifying the set of maximal excess configurations, creating a current output set of configurations, and assigning the supply in response to the acceptance of the input, processing at process block 720 completes, and processing continues to END block 725, where process 700 ends.

—Partial Solutions—

For series of days with very large sets of supplies and demands, it may not be possible to complete the optimization for the full series of days in a reasonable time. Many optimization engines give "all or nothing" results: stopping part way through leaves nothing of value. However, the method and system described herein runs from earliest time period (days) towards latest—for each Distribution in the series of days, it builds a local table first and then creates an output set before going on to the next Distribution. This process may be stopped at any time, and still result in a solution valid for the time period up through the latest Distribution for which the output set has been completed. Consequently, the user who wishes to rapidly explore many near-term options may be satisfied with a short timeout value that does not include solutions for far future supply and demand which, for example, they may consider to be more speculative and/or subject to change.

Figure 8:
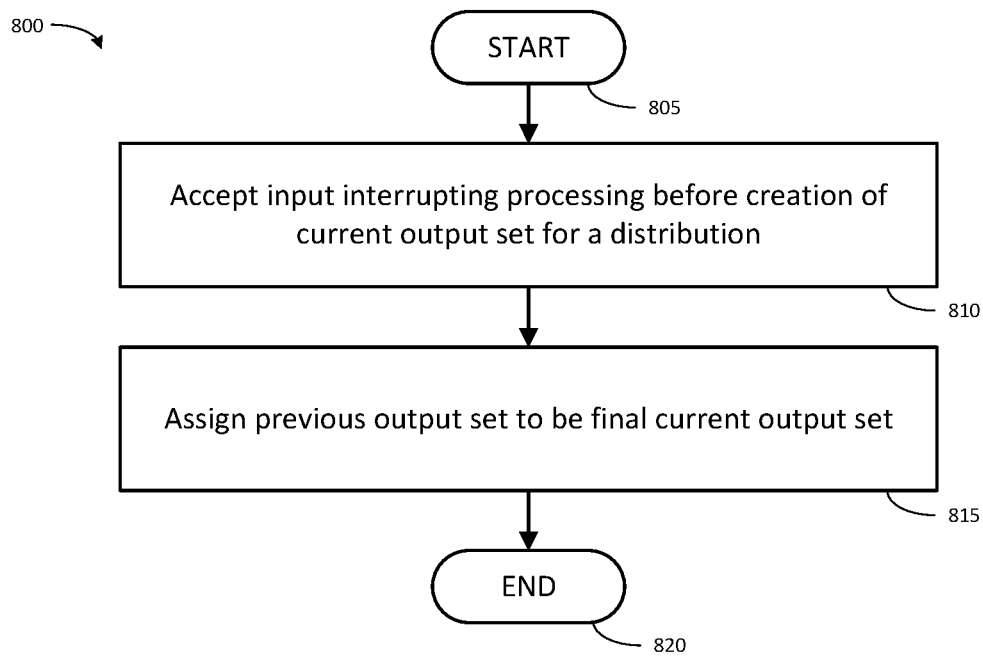
FIG. 8. illustrates one embodiment of a method for enabling partial solutions associated with minimizing unfilled demands due to short supply.

FIG. 8. shows one embodiment of a method 800 for enabling partial solutions associated with minimizing unfilled demands due to short supply. The method 800 may be initiated based on various triggers, such as receiving a signal over a network or parsing stored data indicating an interruption of processing in method 300 (shown and described with reference to FIG. 3). The method 800 initiates at START block 805 in response to parsing a signal received or stored data retrieved and determining that the signal or stored data indicates that the method 800 should begin. Processing continues to process block 810.

At process block 810, the processor accepts an input that interrupts processing before creation of the current output set of configurations in one of the runs.

In one embodiment, the processor accepts an input while the processing for creation of the current output set of configurations in one of the runs is ongoing. The processor parses the input and determines that it is intended to interrupt or stop the process. For example, the processor may identify that the input is a cursor selection of a "stop" button, an "escape" key signal, or any other input that the GUI is configured to recognize as intended to interrupt the process.

Once the processor has thus accepted an input that interrupts processing before creation of the current output set of configurations in one of the runs, processing at process block 810 completes, and processing continues to process block 815.

At process block 815, the processor assigns the previous output set to be the final current output set.

In one embodiment, the processor stops the processing for creating the current output set for the supplies and demands of the current Distribution. The processor then determines which output set data structure is associated with the Distribution immediately preceding the one for which processing was interrupted or stopped. For example, this may be the most recent entry in a data structure for all output sets for the timeframe. The processor creates an indication in a data structure in memory that the most recent entry is the final current output set.

Once the processor has thus completed assigning the previous output set to be the final current output set, processing at process block 815 completes, and processing continues to END block 820, where process 800 ends.

—Prioritized Demands—

In one embodiment, the demands for the product are each associated with a fulfillment priority level, and the pass through the set of Distributions for identifying the set of maximal excess configurations, creating the current output set of configurations, and the pass through the set of Distributions for assignment of the supply units are both performed for all demands of a first fulfillment priority level before being performed again for all demands of a lower second priority level, repeating for each priority level in turn. The identifying and creating the output set pass, as well as the assignment pass must be completed for a priority level before proceeding to the next lower priority level in order to have the information required to perform all operations on that next lower priority level. In particular, the assignment pass must be completed so that the number of units depleted from each source of supply is recorded. Further, prioritizing expenditure of later-arriving supply over earlier-arriving supply (as discussed above) in each priority level also has the advantage of retaining the most flexibility for assignments in lower priority levels—the most 'powerful' remaining units are reserved for assignments in the lower priority level. This helps ensure that the process achieves an optimal solution.

Figure 9:
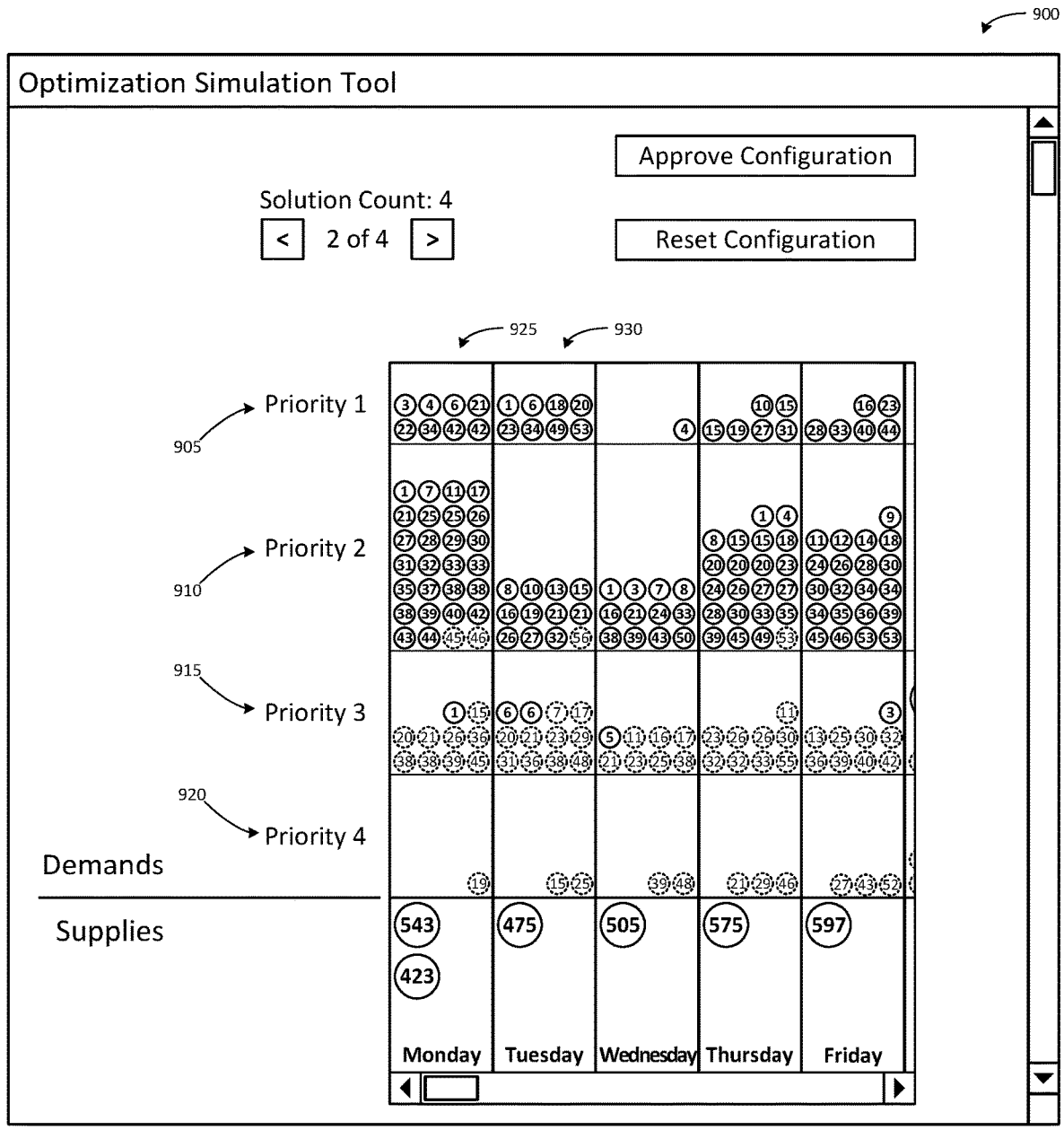
FIG. 9 illustrates another embodiment of a tool for representing and manipulating scheduled supplies and demands associated with minimizing unfilled demands due to short supply using a graphical user interface, where the demands are prioritized.

FIG. 9 illustrates one embodiment of a tool 900 for representing and manipulating scheduled supplies and demands associated with minimizing unfilled demands due to short supply using a GUI, where the demands are prioritized.

In one embodiment, each individual demand may have a fulfillment priority element associated with it, in addition to the time and size elements. Various numbers of priority levels may be selected, based on system requirements and user specifications. In one embodiment, the fulfillment priority element may have four possible values: priority 1, priority 2, priority 3, and priority 4, where priority 1 represents the highest priority orders, and priority 4 represents the lowest priority orders. In one embodiment, there may be any number N of priority levels. In a situation where there is a supply shortage, supply should be preferentially allocated to higher priority orders over lower priority orders. Higher priority orders are thus met first, before lower priority orders are considered. For example, the Oracle® Netsuite® order fulfillment software includes such a prioritization scheme.

The tool 900 includes a visual representation of the fulfillment priority levels as priority bands or tiers across the visual representation of the timeframe. Priority 1 tier 905 includes visual representations (such as demand circles) of all demands associated with fulfillment priority 1. Priority 2 tier 910 includes visual representations of all demands associated with fulfillment priority 2. Priority 3 tier 915 includes visual representations of all demands associated with fulfillment priority 3. Priority 4 tier 920 includes visual representations of all demands associated with fulfillment priority 4.

The tool 900 also maintains the subdivisions of the timeframe for the time units (such as days). For example, Monday subdivision 925 includes the visual representations of all demands that should be met on that Monday; Tuesday subdivision 930 includes the visual representations of all demands that should be met on that Tuesday; etc.

Note that as the fulfillment priority level descends, a higher and higher proportion of unmet orders appears. This is appropriate in view of the level of fulfillment priority for each of these orders.

Demands displayed in the tool 900 may also be marked as required to be met, required to be unmet, or of no requirement, as shown and described with reference to FIGS. 6a-d herein.

Figure 10:
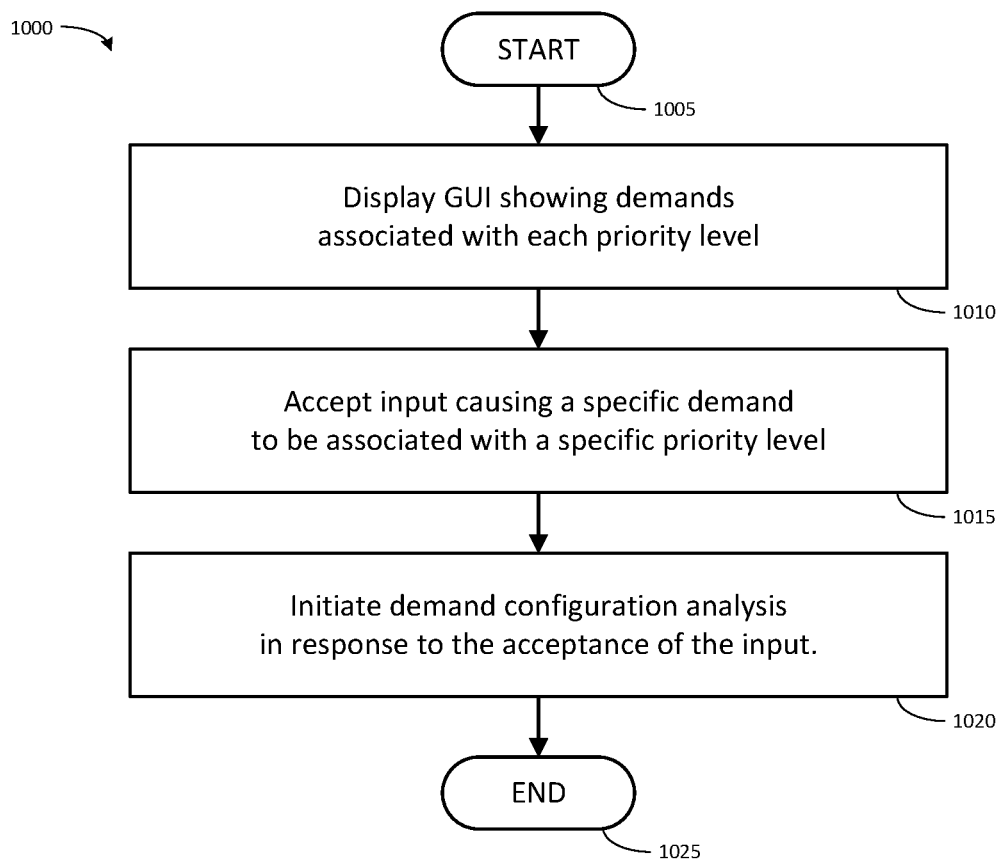
FIG. 10 illustrates one embodiment of a method for operating a graphical user interface tool associated with minimizing unfilled demands due to short supply, where the demands for the product are each associated with various fulfillment priority levels.

FIG. 10. shows one embodiment of a method 1000 for operating a GUI tool (such as tool 900) associated with minimizing unfilled demands due to short supply, where the demands for the product are each associated with various fulfillment priority levels. The method 900 may be initiated based on various triggers, such as receiving a signal over a network or parsing stored data indicating a request for the GUI tool. In one embodiment, method 1000 is initiated as part of a larger process, such as method 300 as shown and described with reference to FIG. 3. In one embodiment, the steps of method 1000 precede the steps of method 300. The method 1000 initiates at START block 1005 in response to parsing a signal received or stored data retrieved and determining that the signal or stored data indicates that the method 1000 should begin. Processing continues to process block 1010.

At process block 1010, the processor displays a graphical user interface that shows the demands associated with each priority level.

In one embodiment, for each time unit (for example, a day) of the time frame, the processor retrieves the unique identifier, size element, and fulfillment priority level of each demand associated with that day. For example, the processor may retrieve each supply and demand entry in a data structure associated with that day, and parse the entry for the unique identifier, the size element, and the fulfillment priority element. The processor generates instructions configured to cause a display device (such as display device 1470) to create a visual representation of the timeframe (such as tool 900). The visual representation of the timeframe includes subdivisions of the timeframe for the time units (days), and further divides the subdivisions into priority tiers, where each tier is associated with one of the possible priority levels. The visual representation of the timeframe also includes a visual representation (such as an icon, circle, or other suitable image) for each supply and demand of every day in the time frame, as discussed above with reference to FIG. 7. The visual representation for each supply and/or demand is located within the subdivision of the timeframe for the time unit (day) associated with that supply and/or demand. The visual representation for each demand is further located within the tier of that subdivision for the priority level associated with that demand. The fulfillment priority tiers appear across the entire timeframe. Thus, each visual representation for a demand that has a particular fulfillment priority level will be displayed in a fulfillment priority tier of the timeframe for that fulfillment priority level, as well as in the subdivision for the time unit. The processor associates the unique identifier of each visual representation of a supply or demand with the visual representation for later reference. The processor then transmits the instructions to a display device associated with a client of the operations management system to cause the visual representations to be displayed, as discussed in further detail above with reference to FIG. 7.

Once the processor has thus completed displaying a graphical user interface that shows the demands associated with each priority level, processing at process block 1010 completes, and processing continues to process block 1015.

At process block 1015, the processor accepts an input through the graphical user interface that causes a demand to be associated with a specific priority level.

In one embodiment, the processor accepts a drag-and-drop operation performed on a visual representation of a specific demand. The visual representation of the specific demand is dragged (for example by clicking and holding a mouse button while moving the cursor) from a first fulfillment priority tier of the timeframe to a second fulfillment priority tier of the timeframe; and dropped into that second fulfillment priority tier (for example by releasing the mouse button while the cursor is within the second subdivision). In response to this drag-and-drop operation, the processor updates the fulfillment priority entry for the specific demand to be the fulfillment priority value associated with the second fulfillment priority tier. The drag-and-drop may also move the visual representation from a first subdivision to a second subdivision, as shown and described with reference to FIG. 7 above.

In another embodiment, the processor accepts a menu selection indicating that an entry for the specific demand should be moved from a first fulfillment priority tier of the timeframe to a second fulfillment priority tier of the timeframe. For example, the menu selection may be a selection of the second fulfillment priority tier for the specific demand. In response to this menu selection, the processor updates the fulfillment priority entry for the specific demand to be the fulfillment priority value associated with the second fulfillment priority tier.

In one embodiment, the change in fulfillment priority tier may be recorded in a data structure for later reversal. For example, the processor may accept the selection of an "undo" button. In response, the processor executes an "undo" function which updates the fulfillment priority entry for the specific demand to be the fulfillment priority value associated with the first fulfillment priority tier.

In another embodiment, all such changes may be reversed in response to a single input. The processor may accept the selection of a "Reset Configuration" button, such as button 660 in the GUI. In response, the processor executes a reset configuration button which (i) returns every supply or demand entry to the data structure associated with the time unit from which it was first moved, and (ii) updates the fulfillment priority entry of every demand to be the fulfillment priority that it first had, placing the configuration of met and unmet demands in the configuration that was initially displayed to the user.

Once the processor has thus completed accepting an input through the graphical user interface that causes a demand to be associated with a specific priority level, processing at process block 1015 completes, and processing continues to process block 1020.

At process block 1020, the processor initiates identifying the one or more runs, identifying the set of maximal excess configurations, creating the current output set of configurations, and assigning the supply units in response to the acceptance of the input.

After accepting the input, the processor initiates the demand configuration analysis functions (the functions for identifying the one or more runs, identifying the set of maximal excess configurations, creating the current output set of configurations, and assigning the supply). In one embodiment, because the demands for the product are each associated with a fulfillment priority level, and because each lower priority level needs information about how much supply is available following higher priority passes, the processor initiates and performs the steps of (i) identifying the set of maximal excess configurations, (ii) creating the current output set of configurations, and (iii) assigning supply units from a specific supply for all demands of a first (higher) fulfillment priority level before being performed again for all demands of a lower second priority level. Thus, these three steps are performed in multiple passes: once through the demands of each priority level in turn. The excess supply remaining at the end of each pass is forwarded to the next pass through the next, lower priority level. In one embodiment, the steps for efficient frontier culling (as discussed elsewhere herein) are also included in each pass. In one embodiment, the steps for future deficit culling (as discussed elsewhere herein) are also included in each pass.

In one embodiment, the process may be interrupted or stopped in response to a cursor selection of a "stop" button, an "escape" key signal, or any other input that the GUI for the tool (such as tool 900) is configured to recognize as intended to interrupt the process. If the user selects it, the process of calculating possible configurations is interrupted or stopped. But, because the passes through priorities are performed sequentially, assigning the remining excess from the previous priority level, priority passes that are lower than the one that is interrupted by the stop command will not be included in the solution. So, in one embodiment, if the stop command is executed during the second priority pass, (i) the first priority pass will include all Distributions in the presented configuration(s), (ii) no Distributions in the second and lower priority passes will be included in the presented configuration(s). In another embodiment, if the stop command is executed during the second priority pass, (i) the first priority pass will include all Distributions in the presented configuration(s), (ii) the second priority pass will include all the Distributions up to but not including the Distribution that was interrupted in the presented configuration(s) (but all the remaining Distributions will not be included in the presented configuration(s)), and (iii) no Distributions in the lower priority passes will included in the presented configuration(s).

The processor then causes the graphical user interface to be re-displayed (or refreshed) in accordance with process block 1010 above. The processor thus causes the graphical user interface to display the configuration of met and unmet demands resulting from the input.

Once the processor has thus completed initiating identifying the one or more runs, identifying the set of maximal excess configurations, creating the current output set of configurations, and assigning the supply in response to the acceptance of the input, processing at process block 1020 completes, and processing continues to END block 1025, where process 1000 ends.

—Some Additional Example Advantages—

Traditional systems and methods for identifying combinations of met and unmet demands, which may, for example, employ a simplex algorithm or a commercial solver such as Gurobi, are computationally costly, slow, and do not allow for partial solutions. These limitations prevent traditional methods from being used in an interactive capacity to explore modifications "what-if" scenarios of met and unmet demand combinations—the limitations of traditional systems and methods prevent a user from seeing the results of a proposed "what-if" scenario substantially in real-time. Also, traditional systems and methods for identifying combinations of met and unmet demands can rapidly exhaust memory resources, because the memory requirements can grow factorially as the number of demands to evaluate grows linearly (due to the combinatorial nature of this problem). Further, the traditional methods and systems do not readily accept constraints such as requiring a certain demand to be met or unmet. Additionally, the traditional systems and methods will provide only one 'best' solution, even though, as discussed above, there may be alternative, equally good solutions that a user will want to evaluate.

The systems and methods presented herein resolve each of these problems. The systems and methods presented herein enable quickly finding one or more minimal cost assignments to a given set of demands using a given set of arriving supplies, making the method suitable for quickly repeated performance to allow a user to explore the effect of rearranging supplies and/or demands (investigating "what-if" scenarios). Also, those lowest cost assignments determined by the systems and methods presented herein may include and identify those with the greatest remaining supply, potentially enabling additional demands not considered (or not yet considered) by the method to be met. Further, the systems and methods presented herein are easily adapted to express constraints such as requiring a certain demand to be met or unmet. Further, the systems and methods presented herein can also be stopped during execution, and the current state used to give a partial solution over a shorter time period than initially presented for processing by the method. Additionally, the systems and methods presented herein are able to present alternative valid solutions. Each of these improvements and advantages is enabled by the operation of the systems and methods described herein, and not by simple brute force application of computing resources.

—Cloud System, Multi-Tenant, and Enterprise Embodiments—

In one embodiment, the present system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the present system is a centralized server-side application that provides at least the functions disclosed herein and that is accessed by many users via computing devices/terminals communicating with the computing system (functioning as the server) over a computer network.

Figure 11:
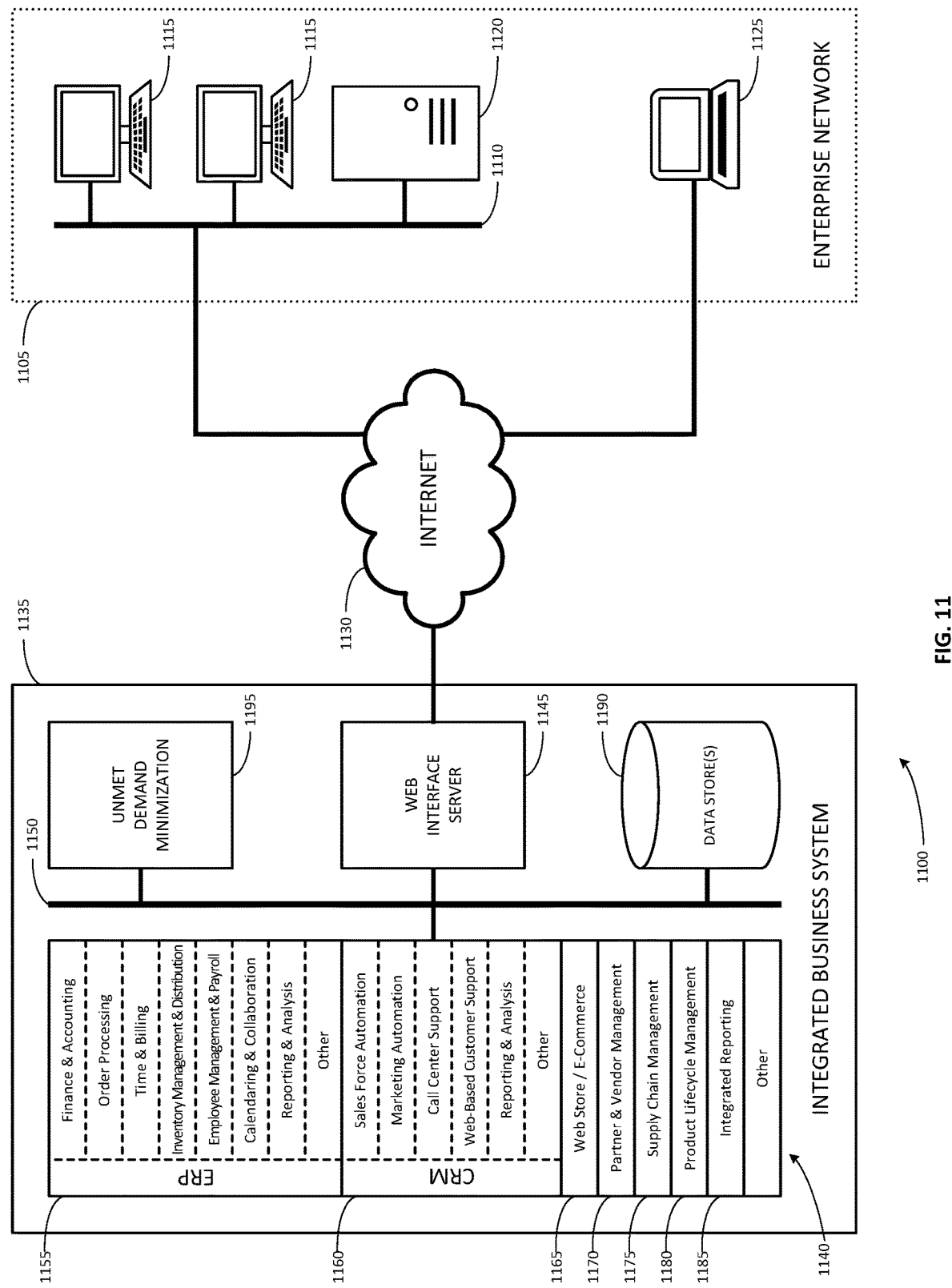
FIG. 11 illustrates one embodiment of a multi-tenant system including minimization of unfilled demands due to short supply.

FIG. 11 illustrates one embodiment of a multi-tenant system including minimization of unmet demands when available supply is insufficient to meet all scheduled demands. Enterprise network 1105 may be associated with a business, such as a retailer, merchant, service provider, or other type of business. Alternatively, and in accordance with the advantages of an application service provider (ASP) hosted integrated financial analytics system (such as a multi-tenant data processing platform), the business may comprise fewer or no dedicated facilities or business network at all, provided that its end users have access to an internet browser and an internet connection. For simplicity and clarity of explanation, the enterprise network 1105 is represented by an on-site local area network 1110 to which one or more personal computers 1115, or servers 1120 are operably connected, along with one or more remote user computers 1125 that are connected to the enterprise network 1105 through the Internet 1130 or other suitable communications network or combination of networks. Each personal computer 1115 is generally dedicated to a particular end user, such as a service agent or other employee associated with the business, although such dedication is not required. The remote user computers 1125 may similarly be dedicated to a particular end user associated with the business. The personal computers 1115 and remote user computers 1125 can be, for example, a desktop computer, laptop computer, tablet computer, smartphone, or other device having the ability to connect to local area network 1110 or Internet 1130 or having other synchronization capabilities. Computing devices of the enterprise network 1105 interface with integrated business system 1035 across the Internet 1030 or another suitable communications network or combination of networks.

Integrated business system 1135, which may be hosted by a dedicated third party, may include an integrated business server 1140 and a web interface server 1145, operably connected by a network 1150. In some embodiments, either or both of the integrated business server 1140 and the web interface server 1145 may be implemented on one or more different hardware systems and components, even though represented as single units in FIG. 11.

One example of an integrated business system 1135 is the Oracle® NETSUITE® cloud business management software suite. NETSUITE® and other integrated business systems (such as Intacct, SAP, Sage, Microsoft® Dynamics) may be improved by incorporating the claimed systems and methods.

In one example configuration, integrated business system 1135 is operated by a third party for the benefit of multiple account owners/tenants, each of whom is operating a business, and each of whom has an associated enterprise network 1105.

In one example configuration, integrated business server 1140 includes various modules, which may include, for example any one or more of an enterprise resource planning (ERP) module 1155, a customer relationship management (CRM) module 1160, a web store/e-commerce module 1165, a partner and vendor management module 1170, a supply chain management (SCM) module 1175, a product lifecycle management (PLM) module 1180, and an integrated reporting module 1185. The ERP module 1155 may include, but is not limited to, a finance and accounting module, an order processing module, a time and billing module, an inventory management and distribution module, an employee management and payroll module, a calendaring and collaboration module, a reporting and analysis module, and other ERP-related modules (such as retail point of sale (POS), product information management (PIM), demand/material requirements planning (MRP), and purchasing modules). The CRM module 1160 may include, but is not limited to, a sales force automation (SFA) module, a marketing automation module, a contact list module (not shown), a call center support module, a web-based customer support module, a reporting and analysis module, and other CRM-related modules (such as contact list, returns management authorization (RMA), and loyalty program support modules). Other modules may also be included, for example, content management system (CMS) and human resources management modules. Further, integrated business server 1140 may further include user administration modules for governing the access of tenants and users to the integrated business system 1135.

In many cases, it will be desirable for the one of the above modules 1155-1185 to share methods, libraries, databases, subroutines, variables, etc., with one or more other of the above modules 1155-1185. For example, ERP module 1155 may be intertwined with CRM module 1160 into an integrated Business Data Processing Platform (which may be single tenant or multi-tenant).

Web interface server 1145 is configured and adapted to interface with the integrated business server 1140 to provide one or more web-based user interfaces to end users of the enterprise network 1105.

Integrated business system 1135 may further include data store(s) 1190 operably connected to integrated business server 1140 and web interface server 1145 by network 1150. In some embodiments, any or all of the integrated business system 1135 the web interface server 1145, and the data store(s) 1190 may be implemented on one or more different hardware systems and components, even though represented as single units in FIG. 11. In some example configurations, data store(s) 1190 may be implemented using a network-attached storage (NAS) device or other dedicated server device.

In one embodiment, an unmet demand minimization server 1195 may be included in the integrated business system 1135. Unmet demand minimization server 1195 is configured and adapted to interface with the integrated business server 140, web interface server 145, and data store(s) 1190 through network 1150. Unmet demand minimization server 1195 may operate to enhance order fulfillment software operations by minimizing unmet demands when available supply is insufficient to meet all scheduled demands, and to generate graphical user interfaces that act as tools for manipulating the minimization processes.

The integrated business system 1135 shown in FIG. 11 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server may be a combination of hardware and the software that delivers content, commonly by hosting a website, to client web browsers that access the web server via the Internet. In one example, web interface server 1145 includes a web server.

Figure 12:
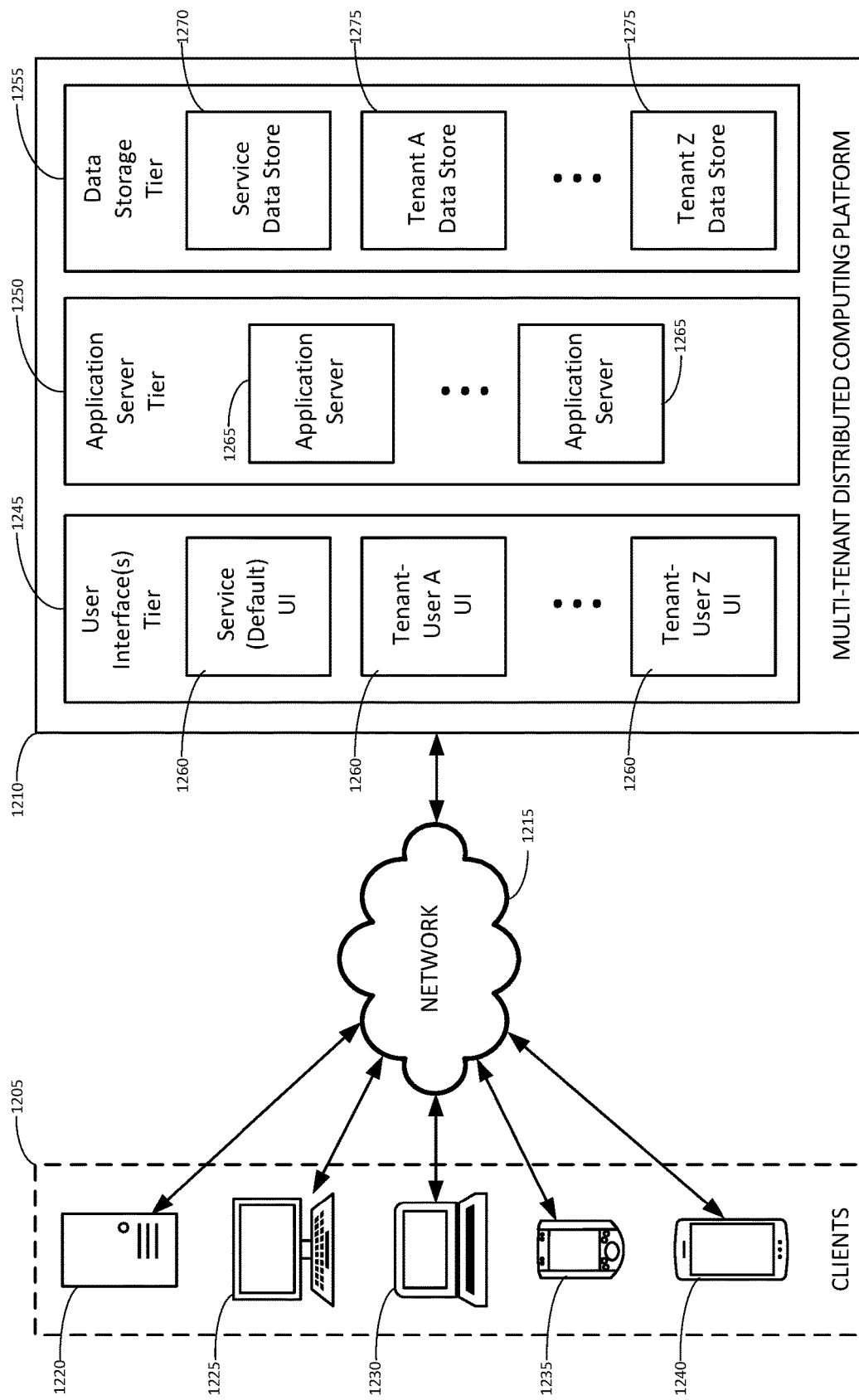
FIG. 12 illustrates elements or components of an example operating environment in which an embodiment of the invention may be implemented.

FIG. 12 is a diagram illustrating elements or components of an example operating environment 1200 in which an embodiment of the invention may be implemented. The software architecture depicted in FIG. 12 represents a simplified example of a complex software system to which an embodiment of the invention may be applied.

As shown, a variety of clients 1205 incorporating and/or incorporated into a variety of computing devices may communicate with a distributed computing service/platform 1210 through one or more networks 1215. For example, a client may incorporate and/or be incorporated into a client application implemented by one or more of the computing devices. Examples of suitable clients include web browsers and dedicated client software applications. Examples of suitable computing devices include server computers 1220, personal computers such as desktop computers 1225 and laptop or notebook computers 1230, tablet computers or personal digital assistants (PDAs) 1235, cell phones or smart phones 1240, and other electronic devices incorporating one or more computing device components, such as one or more electronic processors, microprocessors, central processing units (CPU), or controllers. Examples of suitable networks 1215 include networks utilizing wired and/or wireless communication technologies and networks operating in accordance with any suitable networking and/or communication protocol (e.g., the Internet).

In one embodiment, distributed computing service/platform 1210 may be a multi-tenant business data processing platform. In this configuration, service platform 1210 may be operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or other network 1215 connection to view, enter, process, or modify certain types of business information.

The distributed computing service/platform 1210 may include multiple processing tiers, including a user interface tier 1245, an application server tier 1250, and a data storage tier 1255. Each processing tier shown in the figure may be implemented with a set of computers and/or computer components including a processor accessing memory, and may perform various functions, methods, processes, or operations as determined by the execution of a software application or set of instructions.

The user interface tier 1245 may maintain multiple user interfaces 1260, including graphical user interfaces and/or web-based interfaces. The user interfaces may include a default user interface for the service to provide access to applications and data for a user or "tenant" of the service (depicted as "Service (Default) UI" in the figure), as well as one or more user interfaces that have been specialized/customized in accordance with user specific requirements (represented by "Tenant-User A UI" . . . "Tenant-User Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc., although not all users will necessarily have permission to view these components.

The application server tier 1250 provides the framework of software to implement the functions or business applications of integrated business server 1140. Such functions or business applications are typically implemented by one or more modules of software code/instructions that are maintained on and executed by one or more application servers 1265 that are part of the platform's application server tier 1250.

The data storage tier 1255 may include one or more data stores, which may include a Service Data store 1270 and one or more Tenant Data stores 1275 (represented by "Tenant A Datastore" . . . "Tenant Z Datastore" in the figure). In one example, these data stores may be included in data store 1190. Each tenant data store 1275 may contain tenant-specific data that is used as part of providing a range of tenant-specific business services or functions, including but not limited to the to the functions or business applications of integrated business server 1140, such as ERP, CRM, etc. Data stores may be implemented with any suitable data storage technology, including structured query language (SQL) based relational database management systems (RDBMS).

Figure 13C:
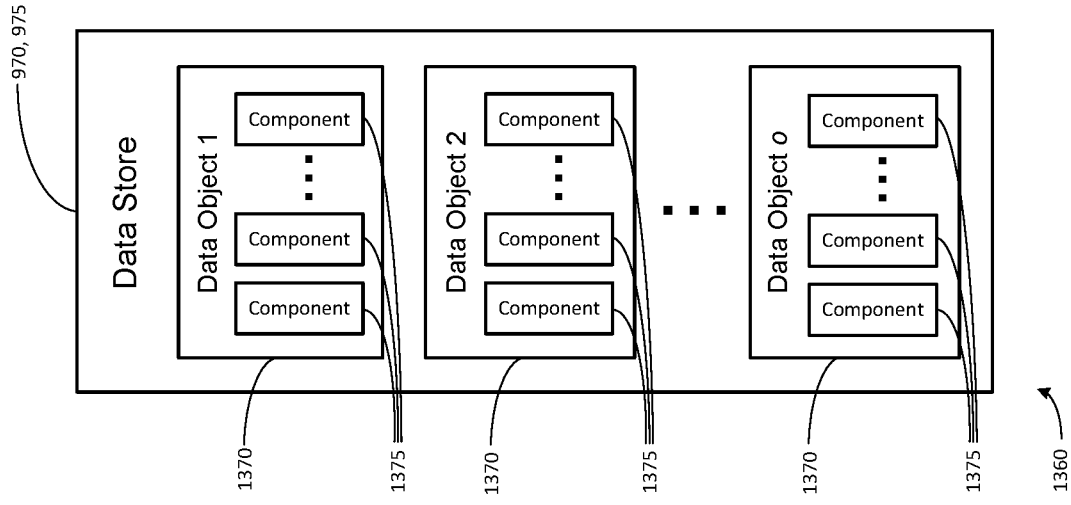
FIG. 13C illustrates additional details of the elements or components of a data store.
Figure 13B:
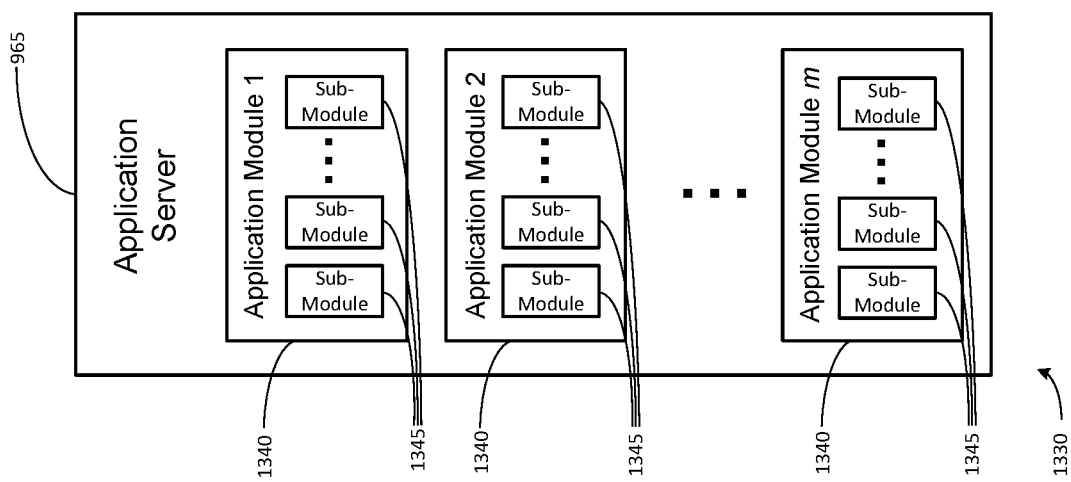
FIG. 13B illustrates additional details of the elements or components of an application server.
Figure 13A:
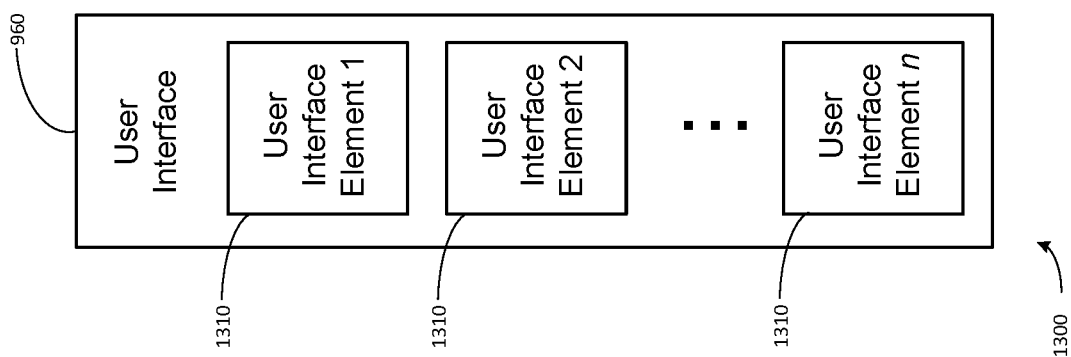
FIG. 13A illustrates additional details of the elements or components of a user interface.

FIG. 13A is a diagram illustrating additional details of the elements or components of the user interface 1260 first presented with reference to FIG. 12. Examples of user interfaces 1260 include graphical user interfaces (GUIs) and application programming interfaces (APIs). Each user interface 1260 may include one or more interface elements 1310 (represented by "User Interface Element 1" . . . "User Interface Element n" in the figure). For example, users may interact with interface elements in order to access functionality and/or data provided by application and/or data storage layers of the example architecture. Graphical user interfaces may be local or remote. Examples of graphical user interface elements include buttons, radio buttons, menus, checkboxes, drop-down lists, scrollbars, sliders, spinners, text boxes, icons, labels, progress bars, status bars, toolbars, windows, hyperlinks, and dialog boxes. Graphical user interface elements may be manipulated by mouse clicks, mouse drag-and-drops, or other operations of cursor controller 1482 or text input devices 1480. Application programming interfaces may be local or remote. Examples of application programming interface elements include parameterized procedure calls, programmatic objects, and messaging protocols.

FIG. 13B is a diagram illustrating additional details of the elements or components of the application server 1265 first presented with reference to FIG. 12. Application server 1265 may include one or more application modules 1340 (represented by "Application Module 1" . . . "Application Module 1 *m*" in the figure), each of which may have one or more sub-modules 1345. Each application module 1340 or sub-module 1345 may correspond to a particular function, method, process, or operation that is implemented by the module or sub-module (e.g., a function or process related to providing ERP, CRM, eCommerce or another functionality to a user of the platform). Each application server 1265 may include each application module. Alternatively, different application servers 1265 may include different sets of application modules. Such sets may be disjoint or overlapping.

FIG. 13C is a diagram illustrating additional details of the elements or components of the data store 1270, 1275 first presented with reference to FIG. 12. Each data store 1270, 1275 may include one or more data objects 1370 each having one or more data object components 1375, such as attributes and/or behaviors. For example, the data store 1270, 1275 may correspond to a relational database, the data objects 1370 may correspond to tables of the relational database, and the data object components 1375 may correspond to columns or fields of such tables. Alternatively, or in addition, the data objects may correspond to data records having fields and associated services. Alternatively, or in addition, the data objects may correspond to persistent instances of programmatic data objects, such as structures and classes. Alternatively, or in addition, the data store 1270, 1275, data objects 1370, and data object components 1375 may each be any form of data structure as described herein. Each data store in the data storage layer may include each data object. Alternatively, different data stores may include different sets of data objects. Such sets may be disjoint or overlapping.

—Software Module Embodiments—

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 14:
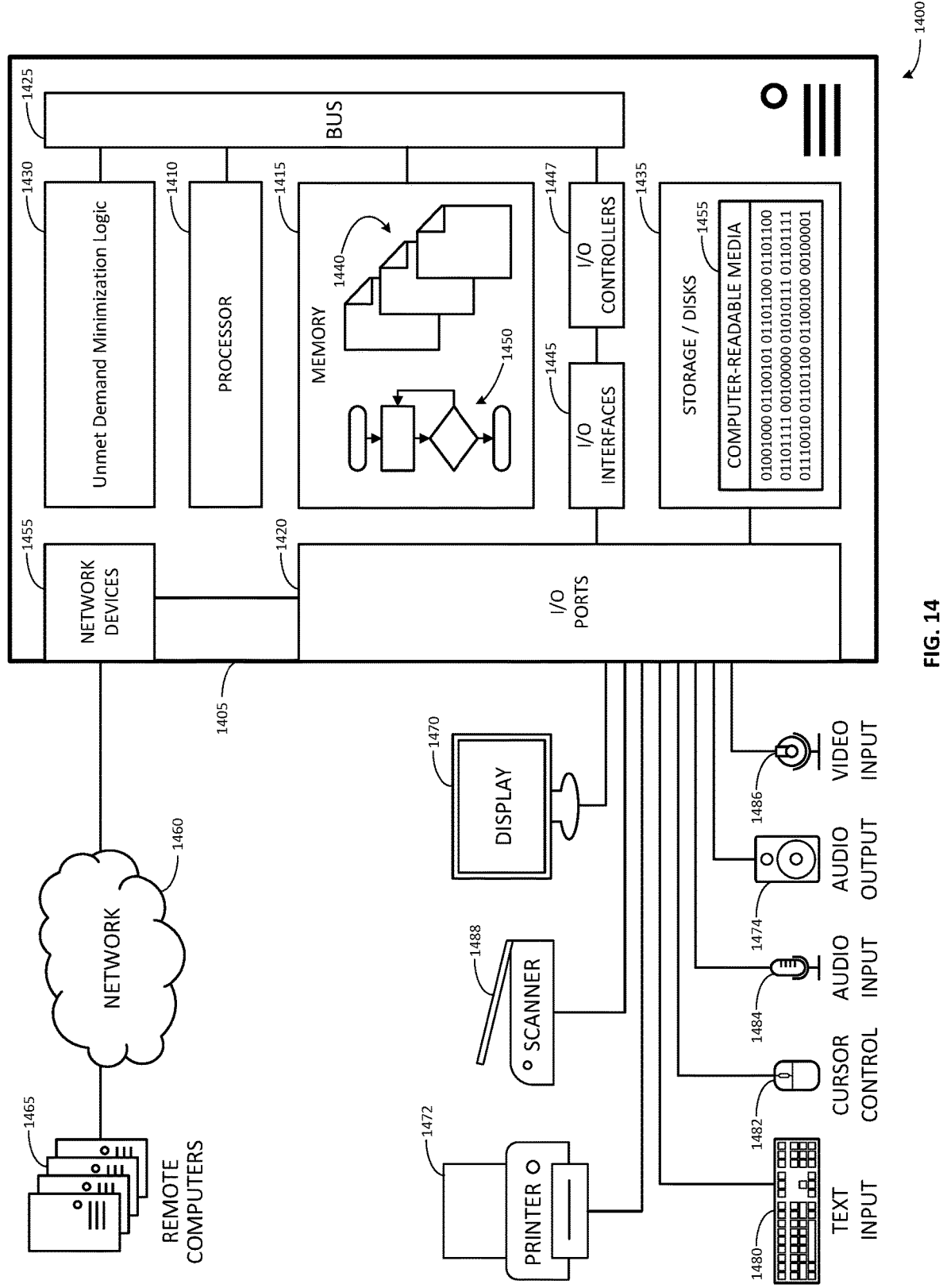
FIG. 14 illustrates an embodiment of a special purpose computing system configured with the example systems and/or methods disclosed.

FIG. 14 illustrates an example computing device that is configured and/or programmed with one or more of the example systems and methods described herein, and/or equivalents. The example computing device may be a computer 1405 that includes a processor 1410, a memory 1415, and input/output ports 1420 operably connected by a bus 1425. In one example, the computer 1405 may include unmet demand minimization logic 1430 configured to facilitate minimization of unmet demands when available supply is insufficient to meet all scheduled demands, similar to the logic, systems, and methods shown and described with reference to FIGS. 1-10. In different examples, the logic 1430 may be implemented in hardware, a non-transitory computer-readable medium with stored instructions, firmware, and/or combinations thereof. While the logic 1430 is illustrated as a hardware component attached to the bus 1425, it is to be appreciated that in other embodiments, the logic 1430 could be implemented in the processor 1410, stored in memory 1415, or stored in disk 1435.

In one embodiment, logic 1430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to automate process discovery and facilitation. The means may also be implemented as stored computer executable instructions that are presented to computer 1405 as data 1440 that are temporarily stored in memory 1415 and then executed by processor 1410.

Logic 1430 may also provide means (e.g., hardware, non-transitory computer-readable medium that stores executable instructions, firmware) for performing automated process discovery and facilitation.

Generally describing an example configuration of the computer 1405, the processor 1410 may be a variety of various processors including dual microprocessor and other multi-processor architectures. A memory 1415 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1435 may be operably connected to the computer 1405 via, for example, an input/output interface (e.g., card, device) 1445 and an input/output port 1420 that are controlled by at least an input/output (I/O) controller 1447. The disk 1435 may be, for example, a magnetic disk drive, a solid-state disk drive, a floppy disk drive, a tape drive, a Zip drive, a flash memory card, a memory stick, and so on. Furthermore, the disk 1435 may be a CD-ROM drive, a CD-R drive, a CD-RW drive, a DVD ROM, and so on. The memory 1415 can store a process 1450 and/or a data 1440, for example. The disk 1435 and/or the memory 1415 can store an operating system that controls and allocates resources of the computer 1405.

The computer 1405 may interact with input/output devices by way of the input/output (I/O) controller 1447, the input/output (I/O) interfaces 1445 and the input/output ports 1420. Input/output devices may be, for example, a keyboard, a microphone, a pointing and selection device, cameras, video cards, displays, the disk 1435, the network devices 1455, and so on. The input/output ports 1420 may include, for example, serial ports, parallel ports, and USB ports.

The computer 1405 can operate in a network environment and thus may be connected to the network devices 1455 via the I/O interfaces 1445, and/or the I/O ports 1420. Through the network devices 1455, the computer 1405 may interact with a network 1460. Through the network 1460, the computer 1405 may be logically connected to remote computers 1465. Networks with which the computer 1405 may interact include, but are not limited to, a LAN, a WAN, and other networks.

The computer 1405 can control one or more output devices, or be controlled by one or more input devices, through I/O ports 1420. The output devices include one or more displays 1470, printers 1472 (such as inkjet, laser, or 3D printers), and audio output devices 1474 (such as speakers or headphones). The input devices include one or more text input devices 1480 (such as keyboards), cursor controllers 1482 (such as mice, touchpads, or touch screens), audio input devices 1484 (such as microphones), and video input devices 1486 (such as video and still cameras).

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device. None of the methods or systems described in this specification can be performed by the human mind. Any interpretation that any method or system described in this specification can be performed by the human mind is inconsistent with this specification and is unreasonably broad.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
    identifying one or more runs of consecutive time units within a timeframe, wherein (i) supplies of a product are added to a stock of the product and demands for the product are fulfilled from the stock of the product during the timeframe, and (ii) a run begins with a time unit that includes an addition of supply to the stock and includes all subsequent consecutive time units that do not include another addition of supply to the stock;
    for each of the runs of consecutive time units, (i) identifying a set of maximal excess configurations of met and unmet demands from a set of all demands for the product during the run, (ii) creating a current output set of configurations for the run, and (iii) removing, from the current output set of configurations, all configurations except a configuration with the greatest amount of excess supply for each possible number of unmet demands during the run;
    for at least one configuration selected from a final current output set for a final run within the timeframe, assigning supply units from a specific supply to satisfy a demand quantity of each met demand; and
    transmitting an instruction to fulfill demands over the timeframe in accordance with the assignments.

2. The computer-implemented method of claim 1, further comprising, for each of the runs of consecutive time units, removing from the current output set of configurations those configurations with an excess supply greater than an excess supply of a configuration with the smallest amount of excess supply that meets or exceeds a total supply deficit of all remaining runs within the timeframe.

3. The computer implemented method of claim 1, further comprising:
    displaying a graphical user interface that shows the supplies and demands associated with each time unit of the timeframe;
    accepting an input through the graphical user interface that causes a specific supply or demand to be associated with a specific time unit of the timeframe; and
    initiating (i) identifying the one or more runs, (ii) identifying the set of maximal excess configurations, (iii) creating the current output set of configurations, and (iv) assigning the supply units in response to the acceptance of the input.

4. The computer implemented method of claim 1 further comprising, for each of the runs of consecutive time units:
    removing from the current output set of configurations of met and unmet demands any configuration that includes a particular demand in response to parsing an indication that the particular demand is required to be met; or
    removing from the current output set of configurations of met and unmet demands any configuration that does not include the particular demand in response to parsing an indication that the particular demand is required to be unmet.

5. The computer implemented method of claim 1, further comprising:
    accepting an input that interrupts processing before creation of the current output set of configurations in one of the runs; and
    assigning the previous output set to be the final current output set.

6. The computer implemented method of claim 1, wherein the demands for the product are each associated with a fulfillment priority level, and wherein each of (i) identifying the set of maximal excess configurations, (ii) creating the current output set of configurations, and (iii) assigning the supply units are performed for all demands of a first fulfillment priority level before being performed again for all demands of a lower second priority level.

7. The computer implemented method of claim 1, wherein the demands for the product are each associated with a fulfillment priority level, further comprising:
    displaying a graphical user interface that shows the demands associated with each priority level;
    accepting an input through the graphical user interface that causes a demand to be associated with a specific priority level; and
    initiating (i) identifying the one or more runs, (ii) identifying the set of maximal excess configurations, (iii) creating the current output set of configurations, and (iv) assigning the supply units in response to the acceptance of the input.

8. The computer-implemented method of claim 1, wherein assigning the supply units further comprises, for each run of consecutive time units in turn from a latest run through an earliest run, for each met demand in the run, assigning the met demand's demand quantity of the supply units from the latest- available unexhausted source of supply.

9. The computer-implemented method of claim 1, wherein creating the current output set of configurations for the run further comprises:
(i) where there is a previous output set of maximal excess configurations for a previous run of consecutive time units, creating the current output set of configurations by combining the set of maximal excess configurations with the previous output set, and
(ii) where there is no previous output set of maximal excess configurations for a previous run of consecutive time units, creating the current output set of configurations by assigning the set of maximal excess configurations to be the current output set.

10. A non-transitory computer-readable medium storing computer-executable instructions that when executed by at least a processor of a computer cause the computer to:
identify, by at least the processor, one or more runs of consecutive time units within a timeframe, wherein (i) supplies of a product are added to a stock of the product and demands for the product are fulfilled from the stock of the product during the timeframe, and (ii) a run begins with a time unit that includes an addition of supply to the stock and includes all subsequent consecutive time units that do not include another addition of supply to the stock;
for each of the runs of consecutive time units, (i) identify, by at least the processor, a set of maximal excess configurations of met and unmet demands from a set of all demands for the product during the run, (ii) create, by at least the processor, a current output set of configurations for the run, and (iii) remove, from the current output set of configurations, all configurations except a configuration with the greatest amount of excess supply for each possible number of unmet demands during the run;
for at least one configuration selected from a final current output set for a final run within the timeframe, assign supply units from a specific supply to satisfy a demand quantity of each met demand; and
transmit, by at least the processor, an instruction to fulfill demands over the timeframe in accordance with the assignments.

11. The non-transitory computer-readable medium of claim 10, further comprising instructions that when executed by at least the processor cause the computer to:
display a graphical user interface that shows the supplies and demands associated with each time unit of the timeframe; and
accept an input through the graphical user interface that causes a supply or demand to be associated with a specific time unit of the timeframe;
wherein (i) identifying the one or more runs, (ii) identifying the set of maximal excess configurations, (iii) creating the current output set of configurations, and (iv) assigning the supply units are performed in response to the acceptance of the input.

12. The non-transitory computer-readable medium of claim 10, further comprising instructions that when executed by at least the processor cause the computer to:
accept an input that interrupts processing before creation of the current output set of configurations in one of the runs; and
assign the previous output set to be the final current output set.

13. The non-transitory computer-readable medium of claim 10, wherein the demands for the product are each associated with a fulfillment priority level, further comprising instructions that when executed by at least the processor cause the computer to:
display a graphical user interface that shows the demands associated with each priority level; and
accept an input through the graphical user interface that causes a demand to be associated with a specific priority level;
wherein (i) identifying the one or more runs, (ii) identifying the set of maximal excess configurations, (iii) creating the current output set of configurations, and (iv) assigning the supply units are performed in response to the acceptance of the input; and
wherein (i) identifying the set of maximal excess configurations, (ii) creating the current output set of configurations, and (iii) assigning the supply units are performed for all demands of a first fulfillment priority level before being performed again for all demands of a lower second priority level.

14. A computing system, comprising:
a processor;
a memory operably connected to the processor;
a non-transitory computer-readable medium operably connected to the processor and memory and storing computer-executable instructions that when executed by at least a processor of a computer cause the computer to:
identify one or more runs of consecutive time units within a timeframe, wherein (i) supplies of a product are added to a stock of the product and demands for the product are fulfilled from the stock of the product during the timeframe, and (ii) a run begins with a time unit that includes an addition of supply to the stock and includes all subsequent consecutive time units that do not include another addition of supply to the stock;
for each of the runs of consecutive time units, (i) identify a set of maximal excess configurations of met and unmet demands from a set of all demands for the product during the run, (ii) create a current output set of configurations for the run, and (iii) remove from the current output set of configurations all configurations except a configuration with the greatest amount of excess supply for each possible number of unmet demands during the run;
for at least one configuration selected from a final current output set for a final run within the timeframe, assign supply units from a specific supply to satisfy a demand quantity of each met demand; and
transmit an instruction to fulfill demands over the timeframe in accordance with the assignments.

15. The computing system of claim 14, wherein the non-transitory computer-readable medium further comprises instructions that when executed by at least the processor cause the computing system to, for each of the runs of consecutive time units;
remove from the current output set of configurations those configurations with an excess supply greater than an excess supply of a configuration with the smallest amount of excess supply that meets or exceeds a total supply deficit of all remaining runs within the timeframe.

16. The computing system of claim 14, wherein the non-transitory computer-readable medium further comprises instructions that when executed by at least the processor cause the computing system to:
- display a graphical user interface that shows the supplies and demands associated with each time unit of the timeframe; and
- accept an input through the graphical user interface that causes a supply or demand to be associated with a specific time unit of the timeframe;
- wherein (i) identifying the one or more runs, (ii) identifying the set of maximal excess configurations, (iii) creating the current output set of configurations, and (iv) assigning the supply units are performed in response to the acceptance of the input.

17. The computing system of claim 14, wherein the demands for the product are each associated with a fulfillment priority level, the non-transitory computer-readable medium further comprises instructions that when executed by at least the processor cause the computing system to:
- display a graphical user interface that shows the demands associated with each priority level; and
- accept an input through the graphical user interface that causes a demand to be associated with a specific priority level;
- wherein (i) identifying the one or more runs, (ii) identifying the set of maximal excess configurations, (iii) creating the current output set of configurations, and (iv) assigning the supply units are performed in response to the acceptance of the input; and
- wherein (i) identifying the set of maximal excess configurations, (ii) creating the current output set of configurations, and (iii) assigning the supply units are performed for all demands of a first fulfillment priority level before being performed again for all demands of a lower second priority level.

18. The computing system of claim 14, wherein the non-transitory computer-readable medium further comprises instructions that when executed by at least the processor cause the computing system to:
- display a graphical user interface that shows the demands; and
- accept an input through the graphical user interface that indicates that a particular demand is (i) required to be met, or (ii) required to be unmet; and
    - (a) remove from the current output set of configurations of met and unmet demands any configuration that includes the particular demand in response to the indication that the particular demand is required to be met; or
    - (b) remove from the current output set of configurations of met and unmet demands any configuration that does not include the particular demand in response to the indication that the particular demand is required to be unmet;
- wherein (i) identifying the one or more runs, (ii) identifying the set of maximal excess configurations, (iii) creating the current output set of configurations, and (iv) assigning the supply units are performed in response to the acceptance of the input.

* * * * *

UNITED STATES PATENT AND TRADEMARK OFFICE
CERTIFICATE OF CORRECTION

PATENT NO. : 11,354,611 B2
APPLICATION NO. : 16/714966
DATED : June 7, 2022
INVENTOR(S) : Smith It is certified that error appears in the above-identified patent and that said Letters Patent is hereby corrected as shown below:

In the Specification

In Column 11, Line 62, delete "that that" and insert -- that --, therefor.

In Column 36, Line 30, delete "to the to the" and insert -- to the --, therefor.

In the Claims

In Column 42, Line 11, in Claim 3, delete "computer implemented" and insert -- computer-implemented --, therefor.

In Column 42, Line 24, in Claim 4, delete "computer implemented" and insert -- computer-implemented --, therefor.

In Column 42, Line 36, in Claim 5, delete "computer implemented" and insert -- computer-implemented --, therefor.

In Column 42, Line 43, in Claim 6, delete "computer implemented" and insert -- computer-implemented --, therefor.

In Column 42, Line 51, in Claim 7, delete "computer implemented" and insert -- computer-implemented --, therefor.

In Column 44, Line 59, in Claim 15, delete "units;" and insert -- units: --, therefor.

Signed and Sealed this
Twenty-second Day of November, 2022

Katherine Kelly Vidal
*Director of the United States Patent and Trademark Office*